United States Patent
Yu et al.

(10) Patent No.: US 10,659,422 B2
(45) Date of Patent: May 19, 2020

(54) CONTENT MANAGEMENT SYSTEMS

(71) Applicant: Brightedge Technologies, Inc., San Mateo, CA (US)

(72) Inventors: Sammy Yu, San Mateo, CA (US); Jimmy Yu, Foster City, CA (US); Lemuel S. Park, Cerritos, CA (US); Joshua Philip Crossman, Los Altos, CA (US); Thomas J. Ziola, Menlo Park, CA (US)

(73) Assignee: BRIGHTEDGE TECHNOLOGIES, INC., Foster City, CA (US)

( * ) Notice: Subject to any disclaimer, the term of this patent is extended or adjusted under 35 U.S.C. 154(b) by 752 days.

(21) Appl. No.: 14/666,934

(22) Filed: Mar. 24, 2015

(65) Prior Publication Data
US 2015/0248484 A1 Sep. 3, 2015

Related U.S. Application Data

(63) Continuation-in-part of application No. PCT/US2014/018454, filed on Feb. 25, 2014, which
(Continued)

(51) Int. Cl.
*H04L 29/12* (2006.01)
*G06Q 30/02* (2012.01)
(Continued)

(52) U.S. Cl.
CPC .......... *H04L 61/15* (2013.01); *G06F 16/958* (2019.01); *G06F 16/9535* (2019.01); *G06Q 30/02* (2013.01); *H04L 61/10* (2013.01)

(58) Field of Classification Search
None
See application file for complete search history.

(56) References Cited

U.S. PATENT DOCUMENTS

| | | | |
|---|---|---|---|
| 8,135,706 B2 * | 3/2012 | Yu | G06F 16/951 707/722 |
| 8,190,594 B2 | 5/2012 | Park et al. | |

(Continued)

FOREIGN PATENT DOCUMENTS

EP  2 302 537 A1  3/2011

OTHER PUBLICATIONS

Extended European Search Report dated Sep. 15, 2017 as received in Application No. 15768323.6.
(Continued)

*Primary Examiner* — Belix M Ortiz Ditren
*Assistant Examiner* — Mellissa M. Ohba
(74) *Attorney, Agent, or Firm* — Maschoff Brennan

(57) ABSTRACT

A method for pairing web pages with keywords may include obtaining a keyword paired with a public web page, the public web page configured to be published at a public address; determining a mapping between the public address of the public web page and an internal address of an internal web page that corresponds to the public web page, the internal address pointing to the internal web page used in a content management system that generates the internal web page and the public web page; creating a keyword-page pairing entry that includes the keyword and the mapping between the public address and the internal address, the keyword-page pairing entry indicating the keyword is paired with the internal web page; and sending the keyword-page pairing entry to the content management system.

20 Claims, 15 Drawing Sheets

Related U.S. Application Data is a continuation-in-part of application No. 13/874,472, filed on Apr. 30, 2013, now abandoned.

(60) Provisional application No. 61/969,820, filed on Mar. 24, 2014, provisional application No. 61/640,706, filed on Apr. 30, 2012, provisional application No. 61/769,186, filed on Feb. 25, 2013.

(51) Int. Cl.
*G06F 16/9535* (2019.01)
*G06F 16/958* (2019.01)

(56) References Cited

U.S. PATENT DOCUMENTS

| | | | |
|---|---|---|---|
| 8,554,775 B2* | 10/2013 | Kon | G06F 17/30864 705/14.4 |
| 9,135,665 B2* | 9/2015 | England | G06Q 30/0282 |
| 9,697,286 B2* | 7/2017 | Hewitt | G06F 17/30887 |
| 2002/0169865 A1* | 11/2002 | Tarnoff | G06F 21/6218 709/223 |
| 2005/0138004 A1 | 6/2005 | Teplitsky et al. | |
| 2008/0134053 A1 | 6/2008 | Fischer | |
| 2008/0270472 A1 | 10/2008 | Yonemoto | |
| 2009/0150372 A1 | 6/2009 | Batista et al. | |
| 2009/0292677 A1 | 11/2009 | Kim | |
| 2009/0307056 A1* | 12/2009 | Park | G06F 17/30864 707/709 |
| 2010/0042613 A1* | 2/2010 | Malden | G06Q 30/02 707/707 |
| 2010/0287033 A1 | 11/2010 | Mathur | |
| 2011/0016104 A1 | 1/2011 | Leconte | |
| 2011/0035486 A1 | 2/2011 | Seolas et al. | |
| 2011/0082858 A1 | 4/2011 | Yu et al. | |
| 2011/0161323 A1 | 6/2011 | Hagiwara | |
| 2012/0016857 A1 | 1/2012 | Gross et al. | |
| 2012/0041938 A1* | 2/2012 | Yu | G06F 16/951 707/709 |
| 2012/0072548 A1 | 3/2012 | Kim | |
| 2012/0254152 A1 | 10/2012 | Park et al. | |
| 2012/0290553 A1 | 11/2012 | England et al. | |
| 2012/0310937 A1* | 12/2012 | Stibel | G06Q 30/018 707/737 |
| 2013/0091118 A1 | 4/2013 | Ajoku et al. | |
| 2013/0290289 A1 | 10/2013 | Yu et al. | |
| 2015/0379141 A1* | 12/2015 | Stouffer | G06F 17/30864 707/706 |
| 2016/0162596 A1* | 6/2016 | Reyes | G06F 17/30864 707/706 |

OTHER PUBLICATIONS

KR Office Action dated Jun. 21, 2018 as received in Application No. 10-2016-7029651.

EP Office Action dated Apr. 24, 2019 as received in Application No. 15 768 323.6.

European Office Action issued in corresponding application No. EP 15768323.6, dated Jan. 23, 2020.

KR Notification of Reasons for Refusal dated Nov. 19, 2019 as received in Application No. 10-2019-7024193.

\* cited by examiner

Keyword-Page Pairing Table 902

| Internal CMS Page URL 904 | Public Page URL 906 | Paired keyword(s) 908 |
|---|---|---|
| staging.store.com/cf#/saleshoes | www.store.com/saleshoes | red shoes |
| staging.store.com/cf#/salesdresses | www.store.com/saledresses | party dresses |
| staging.store.com/cf#/saleblazers | www.store.com/saleblazers | blue blazer |
| ... | ... | ... |
| staging.store.com/cf#/salejackets | www.store.com/salejackets | blue blazer |
| ... | ... | ... |
| staging.store.com/cf#/salehats | www.store.com/salehats | cowboy hats, baseball caps |
| ... | ... | ... |

Internal-Public-Address Mapping Table 1002

| Internal CMS Page URL 1008 | Public Page URL 1010 |
|---|---|
| staging.store.com/cf#/saleshoes | www.store.com/saleshoes |
| staging.store.com/cf#/saledresses | www.store.com/saledresses |
| staging.store.com/cf#/saleblazers | www.store.com/saleblazers |

Keyword-Public-Address Mapping Table 1004

| Public Page URL 1012 Used in SEO System | Keyword(s) 1014 Paired with Public Page URL 1012 |
|---|---|
| www.store.com/saledresses | party dresses |
| www.store.com/saleblazers | blue blazer |
| www.store.com/saleshoes | red shoes |

Fig. 10A

Internal-Public-Address Mapping Table 1002

| Internal CMS Page URL 1008 | Public Page URL 1010 |
|---|---|
| staging.store.com/cf#/saleshoes | www.store.com/saleshoes |
| staging.store.com/cf#/saledresses | www.store.com/saledresses |
| staging.store.com/cf#/saleblazers | www.store.com/saleblazers |

Aligned Keyword-Public-Address Mapping Table 1006

| Public Page URL 1012 Used in SEO System | Keyword(s) 1014 Paired with Public Page URL 1012 |
|---|---|
| www.store.com/saleshoes | red shoes |
| www.store.com/saledresses | party dresses |
| www.store.com/saleblazers | blue blazer |

CONTENT MANAGEMENT SYSTEMS

CROSS-REFERENCE TO RELATED APPLICATIONS

This patent application claims the benefit of and priority to U.S. Provisional Patent Application No. 61/969,820, filed Mar. 24, 2014. This patent application is also a continuation-in-part application of International Application No. PCT/US2014/018454, filed Feb. 25, 2014, which is a continuation-in-part application of U.S. Non-Provisional patent application Ser. No. 13/874,472, filed Apr. 30, 2013, which claims the benefit of and priority of U.S. Provisional Patent Application No. 61/769,186, filed Feb. 25, 2013 and U.S. Provisional Patent Application No. 61/640,706, filed Apr. 30, 2012. The foregoing applications are incorporated herein by reference.

TECHNICAL FIELD

Technologies described herein are related generally to content management systems, content authoring systems, and search engine optimization systems.

BACKGROUND

Unless otherwise indicated herein, the subject matter described herein are not prior art to the claims in the present application and are not admitted to be prior art by inclusion in this section.

In the digital marketing industry, organic (i.e., un-paid) searches are the primary focus of search engine optimization (SEO). Additionally, organic searches represent a large percentage of all search traffic. Consequently, a large percentage of on-line traffic, conversion events, and on-line revenue may be generated due to organic searches. To improve performance results in organic searches, web pages may be paired with keywords and those keywords may be manifested in suitable places on the pages so that search engines may crawl and evaluate the keywords. For example, pairing pages with proper keywords and manifesting those keywords in different places on the pages may help to increase visitor traffic and conversion events (e.g., orders, revenues, downloads, registrations, etc.) for the pages or related web sites.

There may be a number of ways to execute pairings of keywords and pages. For example, a keyword may be inserted into a body of text on a page or a title of a public uniform resource locator (URL) for the page. However, failure to pair pages with proper keywords and to reflect the keywords in proper places on those pages may have a negative impact on a business's web site performance. For example, an improper keyword paired with a preferred landing page on a web site may fail to drive visitor traffic to the preferred landing page.

Generally, search engines may analyze pages for keywords and phrases in the body of texts, titles, title tags, URL addresses, among others, and may combine the information across vast numbers of web site crawls to determine what a particular page is about and its relevance to end user keyword searches on the search engines. Thus, when a search engine detects keywords from the body of text, titles, URL names, or image tags, etc. associated with various pages, the search engine may use the detected keywords to determine which pages to display to an end user when the end user enters a keyword on the search engine. If the keywords in the body of text, titles, URL names, or image tags, etc. on the pages are incorrect, the search engine may fail to return the pages to targeted end users responsive to the end users entering search terms in the search engine.

The volume of searches and associated financial implications may be enormous. Search-originated traffic to web sites may be one significant channel for attracting visitor traffic to web sites, and numerous transactions may be facilitated by search engines that direct end users to web pages responsive to the end users entering search terms into the search engines. However, improper associations between web pages and keywords may fail to drive search-originated traffic from the search engines to the web pages, thereby causing the web pages to lose opportunities to generate revenue.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

According to an aspect of an embodiment, a method for pairing web pages with keywords may include obtaining a keyword paired with a public web page. The public web page is configured to be published at a public address. The method may include determining a mapping between the public address of the public web page and an internal address of an internal web page that corresponds to the public web page. The internal address may point to the internal web page used in a content management system that generates the internal web page and the public web page. The method may include creating a keyword-page pairing entry that includes the keyword and the mapping between the public address and the internal address. The keyword-page pairing entry may indicate the keyword is paired with the internal web page. The method may include sending the keyword-page pairing entry to the content management system.

According to an aspect of another embodiment, a method for pairing web pages with keywords may include obtaining a keyword-public-address entry. The keyword-public-address entry may include a keyword paired with a public web page. The public web page may be published at a public address. The method may include creating, based on an internal rule, an internal-public-address entry that maps an internal address of an internal web page to the public address of the public web page. The internal web page may correspond to the public web page and may be used in a content management system. The method may include aligning the keyword-public-address entry with the internal-public-address entry to pair the keyword with the internal web page.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

To further clarify various aspects of some embodiments of the present invention, a more particular description will be rendered by reference to specific embodiments that are illustrated in the appended drawings. It is appreciated that these drawings depict only embodiments of the invention and are therefore not to be considered limiting of its scope. The embodiments will be described and explained with additional specificity and detail through the use of the accompanying drawings:

FIG. 9 illustrates an example embodiment of a keyword-page pairing table;

FIG. 10A illustrates an example embodiment of an internal-public-address mapping table and a keyword-public-address mapping table;

FIG. 10B illustrates an example embodiment of the keyword-public-address mapping table of FIG. 10A aligned with the internal-public-address mapping table of FIG. 10A;

FIG. 12 illustrates an example embodiment of a recommendation highlighted on a page.

DETAILED DESCRIPTION

Figure 1:
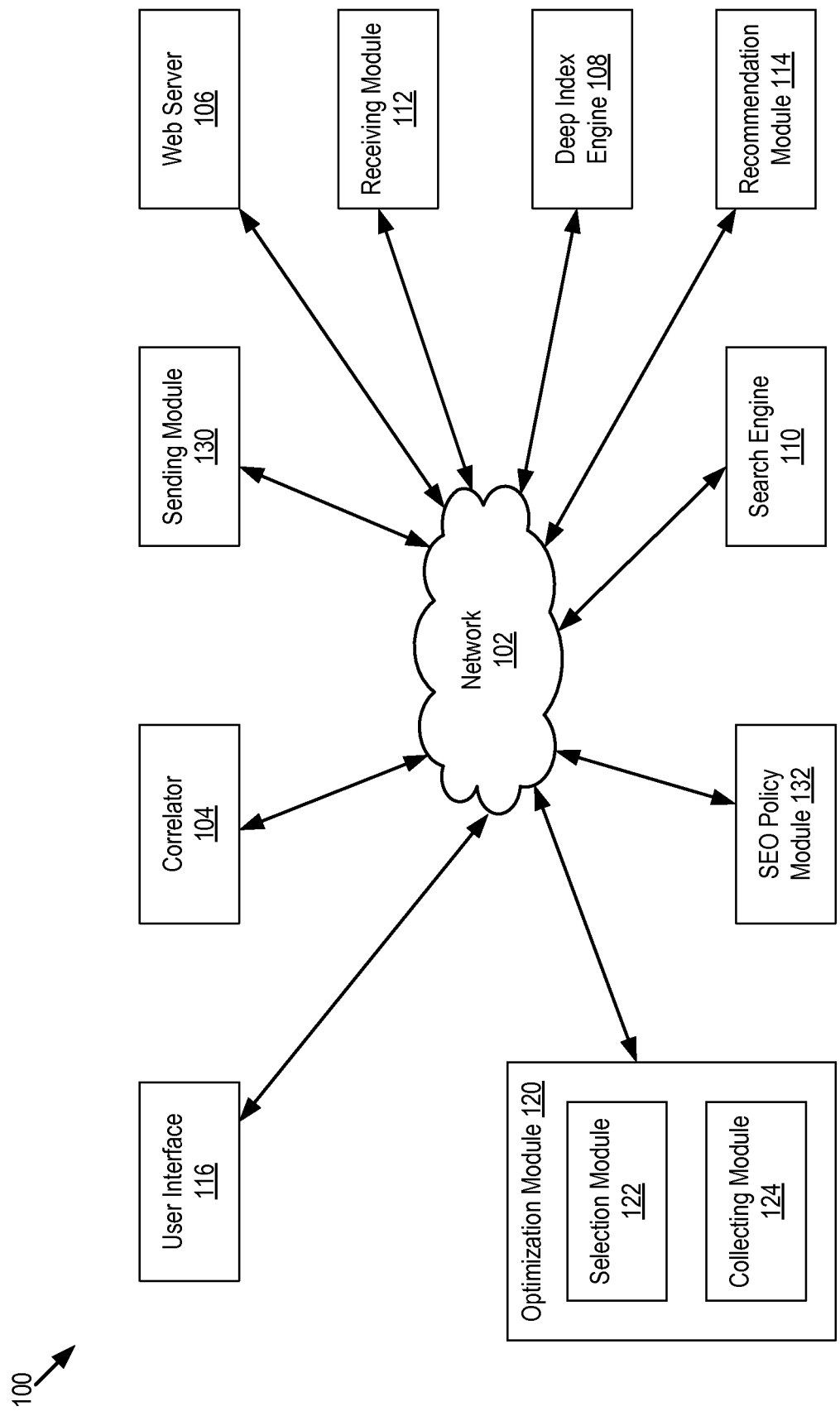
FIG. 1 illustrates an example embodiment of an SEO system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Generally, keywords may be manually paired to pages. For example, an author of a page may enter a keyword and associate the keyword with the page. In another example, the author may use a spreadsheet that lists keywords paired with certain pages. The author may enter the keywords listed in the spreadsheet in appropriate fields in a content management system (CMS) on a page-by-page basis. In existing technologies, this manual keyword-pairing mechanism may not trigger execution of any optimization software algorithm or system-driven recommendations suggesting what the author may do to optimize the page for the desired keyword. However, embodiments described in the disclosure may include automatically and dynamically applying SEO industry practices in a CMS. In addition, embodiments described herein may include triggering a mechanism inside the CMS to assist the author to better optimize the content on the page for better search performance.

Some embodiments described herein relate to integrating an SEO system with a CMS system and/or other systems such as a social network system. Through integration of the SEO system with the CMS system, information may be exchanged and synchronized between the integrated systems efficiently. The integration of the SEO system and the CMS system may increase operational efficiencies, improve targeting of content to desired audiences, and increase the impact of content on conversion intent of desired audiences. For example, integration of the SEO system and the CMS system may reduce down time, implementation complexity, and execution costs, and may improve management oversight.

In a further example, some SEO systems, which may generally operate to achieve improved search results for commercial entities, may be designed to operate independently of other systems, such as CMS systems and content authoring systems. Due to a fast pace at which content is developed and presented to end users by the other systems and an increasing rate at which web site and content performance information may be made available, the SEO systems may be integrated with CMS systems or other systems to satisfy business needs and demands of commercial entities.

Some embodiments described herein relate to managing digital content. In particular, some embodiments relate to SEO in the context of managing digital content as well as technologies included in an SEO system that provides SEO analytics regarding management of digital content. The SEO system may be integrated with a third party system. The SEO system may, by virtue of integration, inform the third party system, direct the third party system, provide recommendations to the third party system, enable execution of recommendations within the third party system, enable execution of recommendations on behalf of the third party system, or some combination thereof. In some embodiments, the third party system may include a CMS system, a web analytics system, a social media network, a social media publishing system, a social media analytics and metrics system, an associated paid media system, a reputation management tracking system, or a backlink tracking or management system. The third party system may further include interfaces between the third party systems and the SEO system. By integrating the SEO system with the third party system, the digital content may be optimized to achieve desired financial, search performance, and optimization results.

In some embodiments, an address translation module in the SEO system or the CMS system may translate and map an internal URL address of an internal page to a public address of a corresponding public page. The internal page may be published as the public page at the public address.

The internal URL address may be used in the CMS system in a testing or staging pre-production environment. The mapping between the internal address and the public address may be used to integrate and provide a wide variety of performance metrics that are related to the selected page using a page address translation mapping index.

Some embodiments described herein may include pairing web pages with keywords in the SEO system. For example, the SEO system may determine a keyword paired with a public web page. The SEO system may determine a mapping between a public URL of the public web page and an internal URL of an internal web page that corresponds to the public web page. The internal web page may be an internal version of the public page and may be used in the CMS system. The SEO system may create a keyword-page pairing entry that includes the keyword and the mapping between the public URL and the internal URL. The keyword-page pairing entry may indicate that the keyword is also paired with the internal web page. For example, the keyword-page pairing entry may indicate that the keyword is paired with the public URL as well as the internal URL. The SEO system may send the keyword-page pairing entry to the CMS system so that users in the CMS system may use the keyword-page pairing entry to pair the keyword with the internal web page.

Some embodiments described herein may include pairing web pages with keywords in the CMS system. The CMS system may receive a keyword-public-address entry from the SEO system. The keyword-public-address entry may include a keyword paired with a public web page. The CMS system may create, based on an internal rule of the CMS system, an internal-public-address entry that maps an internal URL of an internal web page to a public URL of the public web page. The internal web page may correspond to the public web page and may be an internal version of the public web page used in the CMS system. The CMS system may align the keyword-public-address entry with the internal-public-address entry to pair the keyword with the internal web page. For example, the CMS system may pair the keyword with the internal URL.

Some embodiments described herein may include detecting duplicate keyword-page pairings and applying one or more governance rules to solve potential pairing conflicts caused by the duplicate keyword-page pairings. For example, tickets may be created for the potential pairing conflicts, and statuses of the potential pairing conflicts may be tracked by the CMS system. However, in some embodiments, two or more pages may be deliberately configured to pair with the same or similar keyword.

Some embodiments described herein may also include detecting and processing duplicate content on one or more pages. For example, duplicate or similar content across different pages may be identified in the CMS system. Authors may be advised not to publish identical or similar content on different pages because the pages may compete with each other for visitor traffic if the pages with the duplicate content are pushed into production. One or more governance rules may be established and applied to process the duplicate content. However, in some embodiments, two or more pages may be deliberately configured to include duplicate content.

A variety of SEO factors, filters, checks, and recommendations may be applied to a third party system (e.g., a CMS system) with which an SEO system was integrated. Such factors, filters, checks, and recommendation may include on-page and/or off-page factors, in addition to an array of content and search performance information about a page or content on the page. For example, the SEO system, the CMS system, and/or another content authoring system described herein may pair a specific keyword or a set of keywords with one or more web pages.

The SEO system and/or the CMS system may determine whether a keyword or a set of keywords has been paired with one or more pages as the one or more pages are being authored or managed in the SEO system and/or the CMS system. In some embodiments, determining whether a keyword or a set of keywords has been paired with the one or more pages may be performed before the one or more pages are pushed into a live production web site environment. Alternatively or additionally, determining whether a keyword or a set of keywords has been paired with the one or more pages may be performed in a pre-production staging environment. The SEO system and/or the CMS system may compare the keyword-page pairings for the one or more pages to other keyword-page pairings to determine whether duplicate keyword-page pairings exist. The SEO system and/or the CMS system may apply one or more governance rules to solve potential pairing conflicts caused by the duplicate keyword-page pairings.

In some embodiments, the SEO system and/or the CMS system may determine presence or absence of a keyword (or a set of keywords) on a page in one or more of: a page address (e.g., a URL); a page title; a metadata description; a body tag; H1 tags; H2 tags; and "ALT" attribute in image tags.

In some embodiments, the SEO system and/or the CMS system may validate SEO guidelines, including one or more of the following: presence or absence of a title tag; whether a title length on a page is correct or incorrect; whether a keyword is found as a first word(s) in the page title; presence or absence of metadata description; presence or absence of H1 tags and H2 tags; whether a number of H1 and H2 tags present on a page is correct or incorrect; whether a number of overall words in a body tag is correct or incorrect; and whether a number of paired keyword occurrences in the body tag is correct or incorrect.

In some embodiments, the SEO system and/or the CMS system may determine a keyword density in the page content by examining and reporting which keywords are present in the page content individually and/or in combination. The SEO system and/or the CMS system may determine a presence frequency of each keyword or combination of keywords in the page content or a piece of page content. The SEO system and/or the CMS system may compare the keywords found on a page or a piece of content on the page to what was intended to be on the page or the piece of content.

In some embodiments, the SEO system and/or the CMS system may recommend keywords based on: (1) topics related to the page or page content; and (2) an index or taxonomy of keywords and related topics that may be administratively defined or alternatively inferred by a machine learning system. The machine learning system may incorporate data from diverse sources and may provide automated intelligence about what keywords may be recommended for a page or a piece of content on the page. Alternatively or additionally, the SEO system and/or the CMS system may recommend keywords based on: (1) information about what competing web sites are ranking on; and (2) information from other external third party source (e.g., social media networks, other search queries, news reports, and other trending or forecasted topics).

In some embodiments, the SEO system and/or the CMS system may recommend corrections to spelling or grammar for text, format of video, tone-of-voice, and/or other configuration on a page based on: (1) information about what competing web sites are ranking on; and (2) information from other external third party sources (e.g., social media networks, other search queries, news reports, and other trending topics).

In some embodiments, the CMS system may not examine content on a page-by-page basis. The CMS system may analyze content for possible additional optimizations while the content is stored in its native format in a central data repository prior to being injected into a page in the CMS system or on a content site.

In some embodiments, the SEO system may provide deep information associated with a page in the CMS system. Example deep information may include, but is not limited to, keyword volume, page traffic, competitive deep data including competing web pages, backlink data for the page, social media references to the page, and other deep index information culled from social media and/or ecommerce systems.

Some embodiments described herein may include establishing organizational governance rules for guiding operations in the CMS system and/or the SEO system. The governance rules may provide permissions for users to perform certain operations. For example, a governance rule may control which authors and/or users may access specific data from a particular system, such as conversion and revenue data from a web analytics system. The governance rules may also provide access control and moderation across multiple users in the CMS system and the SEO system, where an SEO system may be integrated into the CMS system. Thus, different users may be able to compare and contrast their individual and group performance as well as to collaborate more interactively on a single page.

Reference will now be made to the figures wherein like structures will be provided with like reference designations. It is understood that the figures are diagrammatic and schematic representations of some embodiments and are not limiting of the present invention, nor are they necessarily drawn to scale.

FIG. 1 illustrates an example SEO system 100 according to some embodiments described herein. The SEO system 100 may be integrated with other systems such as a CMS, a content authoring system, and/or other third party systems. The SEO system 100 may provide SEO data, integrated external data, search or social metrics, and/or recommendations to a third party for integration into a third party system. The third party system may be operated, managed, owned, and/or controlled by the third party. For example, the third party system may include a CMS and the SEO system 100 may provide SEO data, integrated external data, and recommendations to the CMS. The SEO data, integrated data, and recommendations may be regarding digital content such as a web site managed by the CMS.

In some embodiments, the SEO system 100 may include a network 102, which may connect the various parts of the SEO system 100 to one another. For example, in these and other embodiments, the network 102 may connect a web server 106, a deep index engine 108, a correlator 104, a search engine 110, an optimization module 120 that may include a selection module 122 and a collecting module 124, a sending module 130, a recommendation module 114, a receiving module 112, and a user interface 116. It will be appreciated that while these are shown as separate, the components may be combined as desired. Further, while one of each component is illustrated, the SEO system 100 may optionally include more than one of each of the illustrated components.

In some embodiments, the network 102 may include the Internet, including a global internet network formed by logical and physical connections between multiple wide area networks and/or local area networks and may optionally include the World Wide Web ("web"), including a system of interlinked hypertext documents accessed via the Internet. Alternately or additionally, the network 102 may include one or more cellular radio frequency ("RF") networks and/or one or more wired and/or wireless networks such as, but not limited to, 802.xx networks, Bluetooth access points, wireless access points, Internet Protocol ("IP")-based networks, or the like. The network 102 may also include servers that may enable one type of network to interface with another type of network. A user of the network 102 may access digital content on the network 102 including, but not limited to, web pages, web sites, social media sites, blogs, e-mails, videos, and other forms of media.

The web server 106 may include any system capable of storing and/or transmitting digital content. The web server 106 may provide access to web pages of a web site or other digital content via the network 102. The digital content stored and/or transmitted by the web server 106 may be analyzed for SEO or to generate one or more recommendations pertaining thereto. The web server 106 may further communicate data to the SEO system 100 to incorporate and/or subsequently process the data.

Digital content may include any number of discrete digital items that may be linked or otherwise associated. For example, a web site may have multiple web pages that are linked with the web site. The aggregation of visits or estimation of such visits to digital content may be referred to as traffic. Digital content as used herein may refer to any online posting, including domains, subdomains, web posts, Uniform Resource Identifiers (URI), URLs, images, videos, non-permanent postings such as e-mail and chat unless otherwise specified. Digital content may further include any discrete digital item that may be associated with other digital items and may or may not be published online. For example, digital content may include web sites and/or web pages that are in testing phases, development phases, prior to being published, prior to access by users, etc. Digital content may further include user reviews, social media preferences, social media messages, social media posts, social medial videos, and other content posted on a social media platform such as Facebook, Twitter, Pinterest, LinkedIn, Foursquare, etc. Digital content may be associated with an entity, which may be any business, corporation, partnerships, collaboration, foundation, individual, or other person or groups of people, that may own, have interest in, or may be otherwise affiliated with the digital content. Generally, the entity associated with digital content is referred to herein as a third party.

The digital content may further include SEO objects. The SEO objects may be any portion of the digital content, another digital object or information or related data about the content that may be used in SEO. Examples of SEO objects may include, but are not limited to, search terms, sometimes referred to as keywords; web pages; social media pages; blogs; backlinks; social media posts; social media promotions; digital items and templates existing within a third party system; items and templates generated by the third party system; and items and templates linked to the third party system. Generally, as used herein, the terms "items," "SEO objects," and "digital content" may overlap. Accordingly, in some circumstances a single article may properly be described as an item, an SEO object, digital content, or some combination thereof. For instance, a blog may be referred to as an SEO object or digital content. The blog may include one or more keywords that may be referred to as an item but may also be categorized as an SEO object.

The deep index engine 108 may be configured to use the SEO objects to collect SEO data associated with the SEO objects and/or digital content. For example, when the SEO object includes a search term, the deep index engine 108 may perform a search of the network 102 using the search term to produce search results and identify references to a third party within the search results. To identify references to the third party, the deep index engine 108 may be configured to crawl the search results. In particular, the deep index engine 108 may be configured to crawl the search results and analyze SEO data associated with the crawl. For example, the deep index engine 108 may determine on-page information and backlink data for each reference in the search results.

The deep index engine 108 according to some embodiments is described in more detail in U.S. Pat. No. 8,190,594 entitled COLLECTING AND SCORING ONLINE REFERENCES, issued May 29, 2012, which is hereby incorporated by reference in its entirety.

The correlator 104 may be configured to collect SEO data associated with the SEO object and/or digital content. For example, when the digital content is a web page, the correlator 104 may determine how many visitors are directed to the web page resulting from a search using a specific search term, an SEO rank of the digital content based on a specific search term, and may estimate a total number of visitors to the digital content, etc. Alternately or additionally, the correlator 104 may determine the number of conversions on a web page resulting from a search using a specific search term. Alternately or additionally, the correlator 104 may determine a network traffic history of a user in relation to digital content. The network traffic history of a user may include, but is not limited to, search terms searched in a search engine (e.g., the search engine 110) that resulted in visits to the digital content; conversions on the digital content; links (e.g., in social media or articles) that directed the user to the digital content; duration the user stayed on the digital content; actions performed on the digital content; usage patterns of the user or a group including the user; preferences of the user; information requested by the user; an agreement by the user to receive additional information; network preferences of the user; other sites visited by the user; and a social media participated in by the user.

The correlator 104 according to some embodiments is described in more detail in co-pending U.S. patent application Ser. No. 12/574,069, filed Oct. 6, 2009 entitled CORRELATING WEB PAGE VISITS AND CONVERSIONS WITH EXTERNAL REFERENCES, which application is hereby incorporated by reference in its entirety.

The search engine 110 may be an internal search engine or private search engine that may be configured to produce search results. The search results may include non-category specific search results, such as web sites. Additionally, the search results may include category specific search results, such as images, videos, news, shopping, blogs, books, places, discussions, recipes, patents, calculators, stocks, timelines, etc. The search engine 110 may also be a public search engine or commercial search engine, such as those search engines of Bing, Google, Yahoo!, or the like.

In some embodiments, the search engine 110 may be configured to provide the search volume of a specific search term that may be evaluated for inclusion in digital content. Alternately or additionally, the search engine 110 may be configured to provide a paid search value of a search term or data related to the paid search value. For example, in some embodiments, the search engine 110 may provide an average value of a cost-per-click advertisement associated with a specific search term. Additionally or alternatively, the search engine 110 may provide a value of costs-per-click advertisements associated with a search term for every entity or a subset of the entities that produce the costs-per-click advertisements.

The receiving module 112 may be configured to receive external data associated with an SEO object or digital content. For example, the digital content may be a web page associated with a third party such as the web server 106. The external data associated with the web page may include information regarding the network traffic history of a user; information regarding presentations of items on the digital content to a particular user, on a particular device, in a particular location, or based on other objectives or results; and information regarding social communications of the user or groups of users regarding digital content.

The information regarding social communications of the user or groups of users may include the social media that is used for the social communications, the topic of the social communications, the text or images or other media in the communication, the frequency and/or length of the social media communications, the tone of the social communications, the number of views of the social communications, the indications of level of influence on or connectivity of the user with other users of the social media, among other information.

In these and other embodiments, the external data may be sourced directly from a social media network. For example, the external data may be sourced via an application programming interface ("API"), from an analysis of the SEO object, or from an external data provider configured to collect and consolidate social media analytic data and social media metrics from social media platforms.

The receiving module 112 may receive the external data from outside the SEO system 100. For example, as mentioned above, an external data provider may collect the external data and communicate the external data to the SEO system 100. More specifically, the external data provider system may communicate the external data to the receiving module 112 of the SEO system 100.

For example, in some embodiments, when the SEO object is a web site and an external data provider system controlled by an entity associated with the web site may provide the external data. In these and other embodiments, the entity may control the web site and/or the entity may have designed the web site for a secondary entity. In these and other embodiments, the external data provider system may include a CMS associated with the entity. The CMS may provide or manage digital content that may be included on the web site or may manage workflow associated with the process of selecting, prioritizing, and authoring digital content for and recommendations regarding the web site and structuring the web site to achieve optimal financial and operational goals. The external data provider system may also be other types of systems that are configured to collect and provide one or more of the different types of external data.

In some embodiments, the external data may be received by the receiving module 112 from other sources that interface with a CMS. The other sources may provide the external data to the CMS, which may provide the external data to the receiving module 112. The CMS may generally enable content teams, authors, editors, or contributors to select, create, edit, target, or otherwise manage digital content intended to be displayed to users. An example CMS is illustrated and described below with reference to FIGS. 2A and 4.

The optimization module 120 may be configured to operably couple and orchestrate work performed by the correlator 104, the web server 106, the deep index engine 108, the search engine 110, the receiving module 112, the recommendation module 114, and the user interface 116.

The optimization module 120 may include various modules for implementing particular functionalities. In some embodiments, the optimization module 120 may be generic to include the selection module 122 and the collecting module 124. The selection module 122 and the collecting module 124 may communicate with, receive data from, and/or send data to one or more of the correlator 104, the web server 106, the deep index engine 108, the search engine 110, the receiving module 112, the recommendation module 114, and the user interface 116 to implement one or more particular functionalities.

In some embodiments, the selection module 122 may be configured to select one or more SEO objects or digital content associated with a third party. For example, the selection module 122 may select a web page or web site as the digital content. Additionally, the selection module 122 may be configured to select digital content that may be provided to the selection module 122 by a CMS or another third party system, for instance.

In some embodiments, the collecting module 124 may be configured to collect SEO data associated with the selected SEO object or the selected digital content. In some embodiments, the SEO data may include signals that include information about the selected SEO object or the selected digital content. The collecting module 124 may coordinate with the web server 106, the deep index engine 108, the search engine 110, and/or the correlator 104 to collect SEO data associated with the SEO object or the selected digital content.

For example, the selected digital content may be digital content provided by a CMS for a published web page. In these and other embodiments, the search engine 110 may search for the digital content in a particular channel and produce search results related to the digital content. The deep index engine 108 may crawl the search results to identify one or more references to the digital content. The deep index engine 108 may also evaluate signals related to the digital content. The signals may include information about the reference to the digital content. For example, the signals may include information such as the search volume directed to the digital content, the location of the reference to the digital content in the search results (i.e., the rank of the reference in the search results), a description of the digital content, a cost for a cost-per-click campaign to direct a given audience to the digital content, among others.

Additionally, in these and other embodiments, the correlator 104 may correlate visits and/or conversions to the web site by a user with an external reference that directed the user to the web site. The SEO system 100 may collect other types of SEO data as discussed, illustrated, and/or contemplated in U.S. Pat. No. 8,190,594 and co-pending U.S. patent application Ser. No. 12/574,069 discussed elsewhere herein.

The recommendation module 114 may be configured to integrate the SEO data, the external data, and the digital content. The recommendation module 114 may then normalize and/or prioritize the SEO data, the external data, and the digital content. Once prioritized, the recommendation module 114 may be further configured to generate one or more recommendations that may optimize the digital content in view of the SEO data and/or the external data or otherwise indicate whether SEO policies have been achieved with respect to the digital content. For instance, the recommendations may allow informed choices about allocation and focus of resources for maximum SEO performance of the digital content or other business and operational goals such as conversion and purchase intent by intended audiences.

The recommendation module 114 may also enable customization of the recommendations. For example, the recommendation module 114 may enable a user to edit, override, or reset a recommendation to better match policies of a third party. Additionally, the customization of the recommendations may enable recommendations to apply differently to certain web pages, groups of web pages across a web site, web pages across multiple web sites, web pages across a domain, sub-domains, and micro-web sites, etc. such that the recommendations may correspond to a management style or goal of a company.

The recommendations and/or analyses generating the recommendations may be applied to one or more portions of the digital content. For example, a third party having a large web site including thousands of web pages may apply the analyses generating the recommendations to a certain portion of the web site that is changing or under construction.

Additionally or alternatively, a first portion of the digital content may be analyzed at a first frequency and a second portion of the digital content may be analyzed at a second frequency. For example, a company having a large web site may continuously analyze a portion of the web site including sales while periodically analyzing the remainder of the web site. Additionally or alternatively, analysis of high-volume landing pages may be analyzed at a first frequency, and lesser-volume pages analyzed at a second frequency.

In some embodiments, the recommendation module 114 may be configured as a centralized policy management and compliance system. The centralized policy management and compliance system may include multiple SEO policies based upon which recommendations are generated, which pages are impacted, which parts of a web site are being analyzed, and differently from one content team, business unit, domain, sub-domain, or from one content-authoring environment to another. For example, since different content teams, business units, domains, sub-domains, or content authoring environments may have different requirements or different needs, different SEO policies may be configured for the different content teams, business units, domains, sub-domains, or content authoring environments. The SEO policies may be set organizationally or machine-learned for one or more web sites, sub-web sites, domains, sub-domains, etc. and customized for each differentially, based on criteria established and managed centrally or by distinct teams, in accordance with corporate policies established by the web site owner, operator, or manager. For example, for an administrator of multiple distinct third parties, the recommendation module 114 may enable customizations across each site, domain, and sub-domain, etc. that are managed by the administrator.

In some embodiments, the recommendation module 114 may prioritize SEO data, the external data, digital content, and the recommendations based on parameters. The parameters may be received from a user or a third party, for instance. The parameters may include, but are not limited to, a time frame in which the recommendations may be accomplished, an indication of a return on investment, an increase or a decrease in revenue, a location, an audience, and a marketing object. The marketing object may include increasing visits to the digital content, increasing the views and/or downloads of the digital content, increasing a number of e-mail addresses collected for a marketing campaign using the digital content, or increasing a number of users that may subscribe to updates through media related to the digital content. In some embodiments, more than one parameter may be included in the recommendation module 114. For example, the parameters may include prioritizing the recommendations based on a location that achieves the greatest return on investment and increasing revenue by more than a predetermined threshold. In addition, the parameters may be established by a mathematical algorithm that may combine and weigh various factors associated with the digital content, such as structural aspects of web sites, industry or social media trends, competitive factors, etc.

When parameters are included in the recommendation module 114, the receiving module 112 may receive signals about the digital content related to the parameters. Additionally, the collecting module 124 may collect signals regarding the digital content related to the parameters. The recommendation module 114 may normalize and/or assign weights to each of the signals (i.e., the signals collected by the collecting module 124 and signals received by the receiving module 112) and perform an analysis on the signals to generate one or more recommendations regarding the digital content.

The recommendation module 114 may produce multiple types of recommendations. The recommendations may include factors that may appear "on-page" as well as factors that may appear "off-page." The recommendations may be relevant to a portion of the digital content or may be relevant to multiple portions of the digital content.

For example, the recommendations may include identifying an SEO object to generate or publish in the digital content; identifying when or how to generate an SEO object in the digital content; identifying when or how to publish an SEO object in the digital content; identifying where to publish an SEO object in the digital content; identifying which SEO objects are trending in which social media channels or on a network related to the digital content; identifying which SEO objects are valuable in which social media channels or on a network related to the digital content; determining an impact of an SEO object on search volume directed towards the digital content, search traffic directed towards the digital content, or web analytics metrics directed towards the digital content; suggesting a choice about which SEO objects to focus on for a campaign involving the digital content for maximum SEO; determining a way to optimize a campaign involving the digital content for multiple keywords; producing a backlink to the digital content; changing items of the digital content; changing a tag within the digital content; using items for the digital content related to a certain demographic; searching at a predetermined frequency for a keyword that leads users to the digital content; identifying a change to layout of the digital content; identifying a change of a code-to-text ratio of the digital content; suggesting a change to a presence of images in the digital content; identifying an alternative tag to include in the digital content; identifying duplicate items on various digital content; identifying competitive information related to the digital content; identifying keyword optimizations for the digital content; identifying keyword-page associations (or pairings) for the digital content; and identifying web site priorities for certain keyword-page associations of one type over other keyword page associations included in the digital content.

In some embodiments, some of the functionalities provided by the recommendation module 114 may be performed by other modules in an SEO system or a CMS. For example, with reference to FIG. 4, an SEO pairing module 412 in an SEO module 210 may cooperate with a CMS pairing module 424 in a CMS 220 to identify keyword-page associations or pairings for digital content such as web pages. The SEO pairing module 412 and the CMS pairing module 424 are described below in more detail with reference to FIG. 4.

In some embodiments, the recommendation module 114 may generate real-time or near real-time recommendations. For example, the collecting module 124 may collect real-time signals regarding digital content. Based on the real-time signals, the recommendation module 114 may recommend a change in the digital content or may identify an error in the digital content. A third party system may implement the change to the digital content in real-time. Furthermore, the recommendations may be delivered immediately to a user, allowing for real-time or near-real-time feedback on the recommendations, the filters, and/or results from execution of the recommendations.

In some embodiments, the recommendation module 114 may generate recommendations based on changing trends in SEO objects. For example, a changing rank of a web site for certain keywords, the search volume for the keywords, the traffic on the web site generated for the keywords, the keywords appearance in social media, the change in behavior of a user on the web site that enters the web site having searched for the keywords, among other keyword trends, may cause the recommendation module 114 to recommend a change in the digital content. For example, the recommendation module 114 may recommend use of digital content related to a certain demographic based on the trend of the certain demographic searching more often for a keyword that leads users to the digital content.

In some embodiments, a third party system such as a CMS may send information to the receiving module 112. The recommendation module 114 may use the information, such as SEO data or external data, to generate recommendations. For example, the information may include items on a web site that are correlated with sales of certain products on the web site and traffic to the web site. Based on the information and SEO data collected through the collecting module 124, the recommendation module 114 may generate recommendations for SEO of the web site.

The recommendations may apply to a single web page or groups of web pages, as selected by a user or by a third party, for instance. In addition, in some implementations the user interface 116 may include a single "button" that the user may select to trigger an analysis of the digital content or some portion thereof and to trigger generation of the recommendations for the digital content. Additionally or alternatively, the button may be included on a third party system such as a CMS and/or an analysis of the digital content may be triggered automatically by a third party system. For example, at a certain point in development of the digital content, such as when the digital content is published, an analysis may be automatically triggered.

Additionally or alternatively, the recommendations may be triggered automatically as described above or through one or more alternative mechanisms in a third party system; through selection of an object shown on-screen in a drop-down menu, which may be included in the user interface 116 (described below), for instance; or through selection of an on-screen recommendation button being a selectable feature in the third party system.

In some implementations, during development of the digital content an analysis may be automatically and/or manually (i.e., through selection of a button) triggered one or more times. For example, upon completion of the digital content an analysis may be automatically triggered. The recommendations periodically generated during development of the digital content may enable a better-optimized final version of the digital content.

In addition, the recommendation module 114 may be configured to record data about recommendations, findings, errors, etc. The recorded data may be collected to provide an automated and/or customizable report. The reports may be provided according to a template in some embodiments. The reports may pertain to the SEO system 100, users of the SEO system 100, recommendations, execution of recommendations, SEO results of the recommendations, etc. For example, the reports may include which web pages or other portions of digital content a user checked and when, what recommendations were generated, and which recommendations were executed for which portions of the digital content, which individuals or groups executed recommendations, when the recommendations were executed, etc. An example report is illustrated and described in more detail with reference to FIG. 11. In some embodiments, similar reports may also be created by a workflow engine 250 of FIG. 2A.

The reports may have discrete results, which may be organized item-by-item, across a type of item, across a portion of digital content, or across an entire example of digital content. Additionally, the reports may include scores (i.e., a level of optimization) for an item, a portion of digital content, an entire example of digital content or for social content on digital content. In some embodiments, the reports may be used in digital content production management. For example, execution of recommendations may be controlled and sequenced. Actions of separate teams may be coordinated, etc.

Additionally or alternatively, the recommendation module 114 may enable a user to "score" or otherwise assess the effectiveness and quality of the SEO of digital content. The score may reflect a level of optimizations of the digital content, for instance. The score may occur automatically in some embodiments. Additionally, the recommendation module 114 may enable prioritization of the recommendations according to the score.

In some embodiments, the recommendation module 114 may be configured to produce a digital content template or generate one or more recommendations according to a third party system template. The digital content template may include or otherwise embody one or more of the recommendations regarding the digital content analyzed by the recommendation module 114. In these and other embodiments, the recommendation module 114 may indicate to a third party system, such as a CMS, through the sending module 130 a type of digital content template that may be created based on the recommendations for SEO. The recommendation module 114 may additionally or alternatively recommend items to include in a digital content template of the third party based on the SEO.

For example, the collecting module 124 may collect signals related to a keyword for which a web site does not appear in search results (or does not appear in top search results). The third party operating the web site may perceive it to be advantageous for the web site to appear as a result of a search based on the keyword. The collecting module 124 may send the information to the recommendation module 114. The recommendation module 114, through the sending module 130, may communicate with a CMS that manages the web site and may enable the generation of a web page for the web site aimed at allowing the web page to perform better in search results. The recommendation module 114 may send information for producing the web page to the CMS. The information may include a type of web page template to use for the web page being created. The information may also include subject matter to include in the web page, such as specific or general items, other related keywords, backlinks to other web pages, backlinks to other web sites, links to social media sites, content from a content store, content from a social media source, paid advertising depending on performance, etc.

The recommendation module 114 may be configured to include actual or estimated financial or optimization results (generally, "SEO results") from executing one or more of the recommendations to generate additional recommendations. The SEO results may include, but are not limited to, an estimated revenue, an actual revenue, an estimated return on investment, an actual return on investment, an estimated duration to achieve a parameter (discussed above), or an actual duration to achieve a parameter.

The recommendation module 114 may be configured to track SEO data collected by the correlator 104. Some examples of the SEO data collected by the correlator 104 may include, but are not limited to, search performance, visits/traffic, conversions, revenue, and engagement metrics, such as likes, dislikes, referrals, posts, re-posts, reviews, end-user rankings, mention velocities, and mentions. In some embodiments, the recommendation module 114 may then report the SEO data to a user. Reporting the SEO data to the user may enable the user to understand one or more SEO results achieved (or not achieved) from execution of recommendations regarding the digital content. In some embodiments, the recommendations may be delivered via an API into a third party system that allows the recommendations to be displayed on an overlay of digital content communicated to the recommendation module 114 for analysis. The recommendations may be displayed over the digital content to illustrate the recommendations. Additionally or alternatively, the recommendations may be displayed via an application plug-in, an independent application, or an application embedded in another application.

In some embodiments, the recommendation module 114 may be configured to review the digital content based on SEO data collected by the collecting module 124, based on filters, based on one or more recommendations, based on input received through the user interface 116, or some combination thereof. The filters and/or the recommendations applied by the recommendation module 114 to the digital content may vary based on the type of digital content and may vary within portions of the digital content. For example, when the digital content includes a web site with multiple web pages, the recommendation module 114 may review a subset of the web pages (e.g., reviewing specifically for one or more particular items or SEO objects) and may review a second subset of the web pages (e.g., reviewing specifically for other items or other SEO objects).

The user interface 116 may enable a user to customize the filters and/or the recommendations applied by the recommendation module 114, applied to specific digital content, and/or applied to specific types of digital content. When incorporated in a system that integrates a third party system with the SEO system 100, customization of the filters and the recommendations may allow for flexibility in generating and reviewing digital content. The flexibility may further enable generation and review of digital content under filters and recommendations specifically customized for the digital content. Thus, digital content may be reviewed by one or more customized filters based on a domain, a sub-domain, whether the digital content is a web site, an intended SEO result, etc.

The review may include an audit of digital content. The digital content being audited may include a web site including multiple pages which is continuously or periodically audited for recommendations. Additionally or alternatively, the recommendation module 114 may enable selection of a portion of the digital content to be periodically or continuously audited. A selected portion may be audited while another portion may be excluded from audit.

In some embodiments, the customization may occur at an SEO policy module 132. Generally, the SEO policy module 132 may enable definition of multiple, customizable SEO policies applied to the digital content during a review and/or analysis. For example, an SEO policy may include a setting that may provide a preference of certain keyword-page pairings over other keyword-page pairings. The preference may be applicable in a third party such as a corporation with multiple content teams that compete internally for targeting certain keywords within a web site under control of individual content teams. Furthermore, the multiple SEO policies may be consolidated into a centralized SEO policy management system. Some additional details of the SEO policy module 132 are provided below with reference to FIG. 4. In some embodiments, an SEO policy may be referred to as an example of governance rules implemented in an SEO system or a CMS system.

In some embodiments, the recommendation module 114 may be configured to review the digital content for similar or identical items. Specifically, the recommendation module 114 may be configured to review the digital content across different portions of the digital content. For example, the recommendation module 114 may review different web pages included in a web site for duplicate content. The similar or identical items may be highlighted and reported. When reported, a third party may evaluate whether it is effective to maintain the identical items or modify/edit the items. Alternatively, the reviewing of similar or identical items on web pages may be performed by a CMS. For example, as described below in more detail with reference to FIG. 4, a duplicate detection module 441 in the CMS 220 may be configured to detect duplicate content on two or more pages.

Additionally, in some embodiments, the recommendation module 114 may be configured to indicate problems and/or corrective recommendations associated with the digital content to a user through the user interface 116. In some embodiments, the recommendation module 114 may indicate the problems and corrective recommendations to a user through the user interface 116. The recommendation module 114 may track the problems and the execution of the corrective recommendation. For example, the recommendation module 114 may receive an indication from a third party when a problem has been corrected. The recommendation module 114 may also receive an indication of an individual or group of individuals that corrected the problems. The recommendation module 114 may make the information regarding the execution of the corrective recommendations available to a user through the user interface 116.

Additionally or alternatively, the user interface 116 may provide a list of the problems associated with the digital content. Additionally or alternatively, the user interface 116 may enable a user to visualize the problems and the corrective recommendations inside the digital content. In these and other embodiments, the user interface 116 may present the digital content to a user and an overlay on top of the digital content that indicates the corrective recommendations.

For example, the overlay may have an icon next to or on top of locations in the digital content with problems. The icon may be in the form of an "SEO" button or other mechanism that may display the corrective recommendation. When a user clicks on the icon, the icon may indicate the problem. In some embodiments, when a user interface device, such as a mouse, hovers over the icon, the problem may be presented to a user. Alternately or additionally, the icon may include text or some other objects that may indicate locations of problems in the digital content. Alternatively, the visualization mechanism may involve highlights of content objects on a page to draw the user's attention to various content elements (such as sections of text, titles, images, videos, audio file, items intended for download or user interaction, including links, social buttons, tags, metadata, or other interactive elements) and to provide background information, analyses of characteristics of the element, or recommendations about the content elements. In some such embodiments, the highlights, overlays, alerts, etc. about individual content elements for a page may be targeted to elements that the system or users may have recommended or required to be prioritized for authoring, editing, analysis, or modification purposes. Example recommendations with visual indications are illustrated with reference to FIGS. 13A-13C.

In some embodiments, the user interface 116 may provide the information to generate the overlay for another module. For example, a web browser or some other module may have a plugin that receives information from the user interface 116 and allows problems with digital content to be displayed as discussed above through the web browser. An example browser 212 including a plugin module 214 is illustrated and described with reference to FIG. 2A. In one such embodiment, the plugin may include Chrome browser extensions. In some embodiments, the user interface may provide information through markings on a visualized representation of hypertext markup language ("HTML") content. For example, one such representation of HTML content may involve a What You See Is What You Get ("WYSIWYG") editor, such as one provided by a CMS or authoring system, e.g., the Adobe AEM CMS system which displays page content in a manner similar to what it would look like on a production web site.

In some embodiments, the recommendation module 114 may implement processes for reviewing digital content analogous to processes for reviewing web pages or web page templates as explained in copending U.S. patent application Ser. No. 13/648,962 entitled "AUDITING OF WEBPAGES," filed on Oct. 10, 2012, which application is hereby incorporated by reference in its entirety.

In some embodiments, the recommendation module 114 may be configured to control the release of recommendations regarding the digital content to the third party. In these and other embodiments, before the recommendation module 114 may allow execution of a recommendation, an indication that the changes to the pages have been allowed may need to be received at the recommendation module 114. The recommendation module 114 may also record execution of recommendations and changes resulting therefrom. For example, the recommendation module 114 may record an individual or group of individuals that executed the recommendation, the item(s) changed in the digital content, when the recommendation was executed, etc.

In some embodiments, the recommendation module 114 may be configured to send one or more recommendations to an administrator. The administrator may be affiliated with the third party or a content team affiliated with a party operating the SEO system 100. The administrator may have administrative control and oversight over execution of recommendations and recommendation workflows. Additionally, the administrator may control which of the recommendations are implemented prior to publication or inclusion of an item into digital content. Specifically, the administrator may perform one or more of the following: approving or rejecting the recommendations; suggesting an alternative recommendation; requesting completion of a recommendation; identifying recommendations to be executed; determining an order in which the recommendations are to be implemented; assigning recommendations to individual content teams; and/or tracking the status of recommendations.

In some embodiments, recommendations identified in a recommendation workflow may include recommendations to be executed by the SEO system 100 and recommendations to be executed on another system integrated with the SEO system 100 such as a CMS. The recommendation workflow in the SEO system 100 may trigger a corresponding recommendation workflow in the other integrated system such as the CMS, or vice versa. The corresponding recommendation workflows may enable management and coordination of the execution of the recommendations between the SEO system 100 and the other integrated system and across content teams included therein. The management and coordination of the execution of the recommendations may include a default or customizable policy. For instance, a management policy may include which recommendations are individually executed, which recommendations are automatically executed, and/or which recommendations are required or recommended to be executed prior to publications, etc.

For example, a recommendation to be performed by a sequence of individuals may be sent to a workflow of a first individual. When the first individual completes her portion of the recommendation, the recommendation may be forwarded to a second individual in the sequence of individuals, etc. The recommendation may be deemed as required prior to publication. Thus, the digital content to which the recommendation applies may be held inactive while the recommendations are executed.

Additionally or alternatively, a recommendation generated by the recommendation module 114 may be communicated to a workflow of a CMS. Content teams working on the CMS may then track, execute, and/or close out the recommendations. Additionally, individuals, such as content authors who are responsible for the recommendations or portions thereof, may perform the execution and provide feedback to track and/or close out the recommendations. An example workflow for providing recommendations to users is illustrated with reference to FIG. 3.

In some embodiments, an internal identifier may be assigned to digital content. For example, an internal URL may be assigned to a web page in a CMS. An external identifier may be assigned to the digital content when the digital content is published. For example, a public URL may be assigned to the web page when the web page is published as a public page. The internal identifier of the digital content may be different from the public identifier of the digital content. Thus, the SEO system 100 may not be able to correlate a published digital content with the digital content available in the CMS. In these and other embodiments, the SEO system 100 may include a look-up table that translates the public identifier of the digital content to the internal identifier of the digital content in the CMS, and vice versa.

Accordingly, the SEO system 100 may be able to determine where the digital content is located in the CMS and published on a network.

The user interface 116 may be configured to receive and present the SEO data, the digital content, the recommendations, the parameters, the SEO results, or any combination thereof. The user interface 116 may additionally be configured to communicate one or more of the SEO data, the digital content, the recommendations, the parameters, the SEO results, or any combination thereof to the recommendation module 114. The recommendation module 114 may use the SEO data, the digital content, the recommendations, the parameters, the SEO results, or any combination thereof when determining recommendations for additional or future recommendations. By using actual values, the recommendation module 114 may further refine the recommendations.

In some embodiments, the external data may be presented inside or as part of an SEO dashboard (not shown). The SEO dashboard may be included in the user interface 116 in some embodiments. The SEO dashboard may provide a visual representation of the external data using charts, graphs, and other visual representations. Alternatively or additionally, the SEO dashboard may present a visual representation of the integration of the collected SEO data and the received external data. The SEO dashboard may track changes over time of the collected SEO data and the received external data as well as issue alerts based on changes of the collected SEO data and the received external data.

Figure 2A:
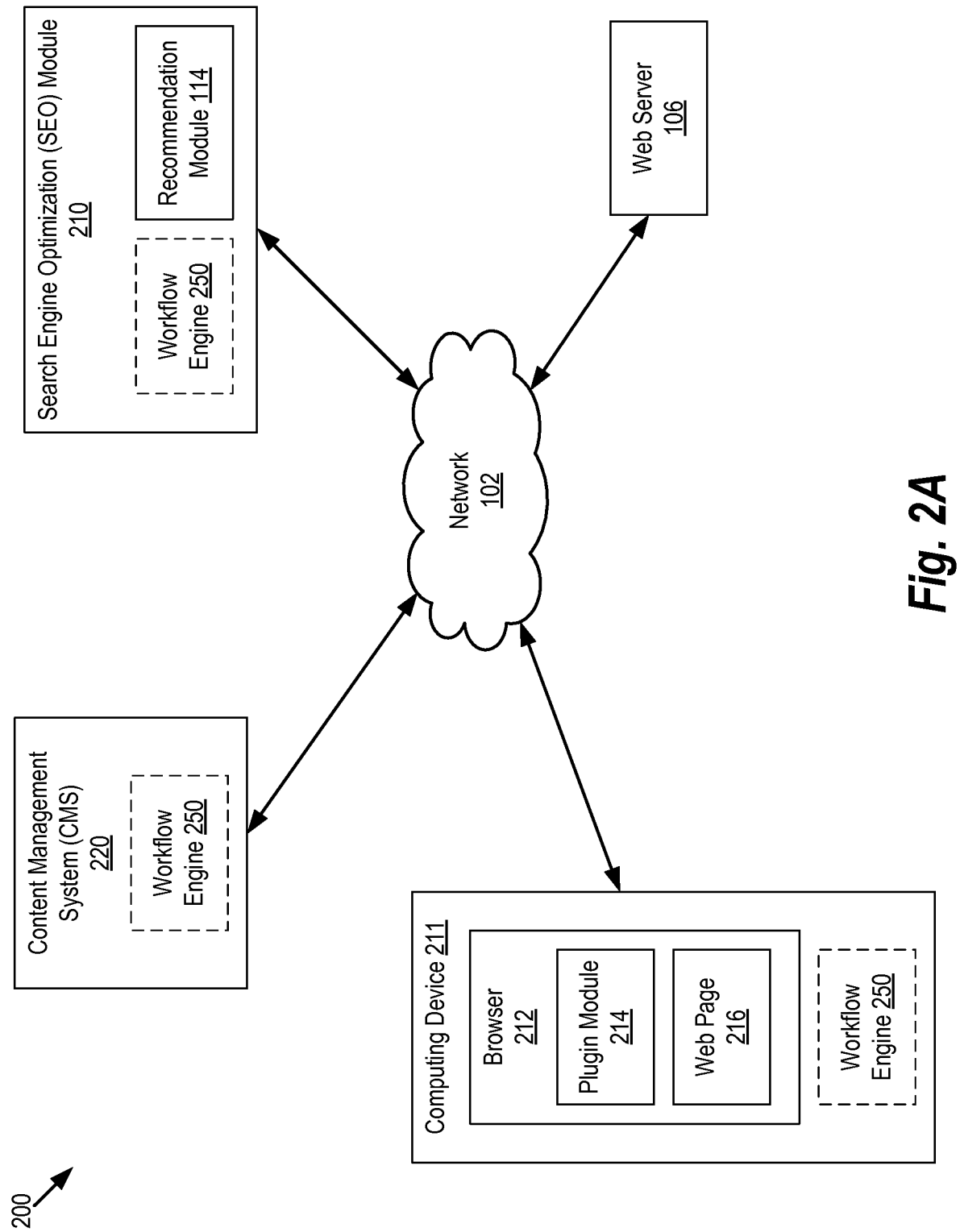
FIG. 2A illustrates an example embodiment of a system including an SEO module integrated with a CMS.

FIG. 2A is a block diagram of a content optimization system 200, arranged in accordance with at least some embodiments described herein. The system 200 may be configured to analyze a web page and optimize SEO performance of the web page. The system 200 may include the CMS 220, the SEO module 210, the web server 106, and a computing device 211. The entities of the system 200 may be communicatively connected to the network 102. In some embodiments, the SEO module 210 and the CMS 220 may be integrated into a single system. For example, the SEO module 210 may be part of the CMS 220.

In some embodiments, the SEO module 210 may include a cloud-based system that may scan hundreds of millions of pages and keywords, while the CMS 220 may not be designed to function in that way. The CMS 220 may focus on how to manage, create, edit, store, test, and/or publish content. The CMS 220 may have APIs that allow other systems to communicate with the CMS 220. By linking the SEO module 210 with the CMS 220 and injecting relevant information and recommendations from the SEO module 210 into the CMS 220, the CMS 220 may use the output from the SEO module 210 to perform operations in an authoring/editing environment inside the CMS 220. For example, the CMS 220 may use external search engine optimization intelligence, real-time information, and recommendations delivered by the SEO module 210 to perform web page optimization (e.g., pairings of pages and keywords) inside the CMS 220.

Incorporation of SEO insights into CMS systems may enable the CMS systems to be more flexible, more automated, and more closely aligned with rapidly-changing search engine practices and algorithms that the CMS systems on their own may not be designed to accommodate. Generally, SEO systems may be built to detect changes in the search algorithms used by search engines. For example, SEO systems may crawl external web pages and/or search engines to detect, measure, and make recommendations related to content and/or presentation of content on relevant web sites so that impact of marketing efforts to drive search traffic to the relevant web sites may be maximized. The SEO systems may generate specific SEO-type reports and recommendations describing how to organize content on web pages so that the web pages may perform better in the search marketing channel. Integrating an external system such as the SEO module 210 with the CMS 220 (or, at least incorporating a mechanism to inject SEO insights, actions, and recommendations into the CMS 220) may provide SEO insights and recommendations in a timely manner during an authoring/editing process in the CMS 220.

In some embodiments, the SEO module 210 may provide functionalities similar to those of the SEO system 100, in addition to other functionalities described with reference to FIGS. 2A and 4. The SEO module 210 may operate in a manner analogous to the SEO system 100. The SEO module 210 may include the recommendation module 114 to provide SEO recommendations for web pages presented on the browser 212.

The CMS 220 may be configured to generate and publish web pages, such as web pages published on the web server 106. In some embodiments, the CMS 220 may assign an internal identifier (e.g., an internal address such as an internal URL) for a web page created and managed by the CMS 220. When the web page is published on the web server 106 as a public page, a public identifier (e.g., a public address such as a public URL) may be assigned to the web page. The internal identifier of the web page used in the CMS 220 may be different from the public identifier of the web page.

In some embodiments, the system 200 may include a content authoring system (not illustrated in FIG. 2A). The content authoring system may provide functionalities similar to those of the CMS 220. The content authoring system and the CMS 220 may be separate systems. Alternatively, the content authoring system and the CMS 220 may be integrated into a single system. In these and other embodiments, the content authoring system may replace the CMS 220 to provide the functionalities described herein without departing from the scope of the disclosure.

The computing device 211 may be any type of electronic device including a processor and a memory. The computing device 211 may include the browser 212. The browser 212 may include a software application configured to receive, present, and traverse information resources on the Internet. For example, the browser 212 may be one of the following types of browsers, including Chrome, Firefox, Internet Explorer, Opera, Safari, among others. In some embodiments, a web page 216 presented on the browser 212 may be a public page published on the web server 106. The browser 212 may use a public identifier (e.g., a public URL) of the web page 216 to download the web page 216 from the web server 106. For example, the browser 212 may send a request including the public URL of the web page 216 to the web server 106 and may receive program code describing the web page 216 from the web server 106. Alternatively, the web page 216 may be an internal page created on the CMS 220. The browser 212 may use an internal identifier (e.g., an internal URL) of the web page 216 to receive the web page 216 from the CMS 220.

The browser 212 may include the plugin module 214 for communicating with the SEO module 210. The plugin module 214 may be configured to allow the computing device 211 to send the web page 216 presented on the browser 212 to the SEO module 210 so that the SEO module 210 may analyze the web page 216. For example, if a user operating the computing device 211 selects to send the web page 216 to the SEO module 210 for analysis, the plugin module 214 may capture at least a portion of program code of the web page 216 and may send the captured program code of the web page 216 to the SEO module 210. The program code may be HTML code, JavaScript code, or another type of program code.

Responsive to receiving the program code of the web page 216 from the plugin module 214, the SEO module 210 may analyze the program code of the web page 216. For example, the recommendation module 114 of the SEO module 210 may analyze the program code of the web page 216 based on SEO audit rules and may determine one or more recommendations for altering the web page 216 using particular SEO audit rules. Alternately or additionally, the recommendation module 114 of the SEO module 210 may analyze the program code of the web page 216 based on SEO audit rules and may determine one or more defects that may be correct on the web page 216. As another example, the recommendation module 114 may audit the web page 216 using the SEO audit rules described herein.

For example, the SEO audit rules may relate to ways to optimize the web page 216 for search engines. The SEO module 210 may determine if different objects within the program code of the web page 216 are following the SEO audit rules. For example, the SEO module 210 may determine if headers, tags, software objects within the program code that relate to the visibility of the program code to search engines, and/or software objects that relate to how a search engine may rank the web page 216 in search results are following SEO audit rules associated with this information. As another example, the SEO module 210 may determine if content portions or other portions of the program code, such as meta-descriptions, include keywords and other information that may affect the ranking of the web page 216 in search results based on SEO audit rules. The SEO module 210 may consider other information (e.g., the type of, number of, and positioning of backlinks; association with social media and links thereto; other aspects of the web page 216 that may affect a ranking of the web page 216 in search results; web traffic on the web page 216; conversions on the web page 216; revenue generated on the web page 216, etc.) when analyzing the program code of the web page 216. Alternately or additionally, an organization may have certain audit rules for their web pages. The SEO module 210 may analyze the program code of the web page 216 based on audit rules established by an organization owning the web page 216. The SEO module 210 may determine if the web page 216 is following the organization's audit rules.

Based on the analysis of the program code of the web page 216, the SEO module 210 (e.g., the recommendation module 114 on the SEO module 210) may determine one or more recommendations for optimizing the program code of the web page 216. The recommendations may relate to one or more particular objects within the program code including, for example, an image, a title, a header, content, backlinks, social network links, a meta-description, among others.

Figure 2B:
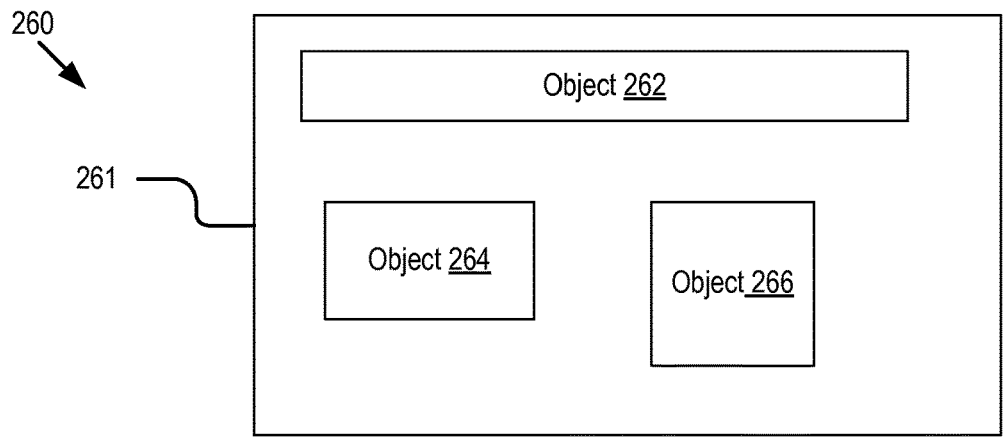
FIG. 2B illustrates an example embodiment of a web page without visual indications of SEO recommendations.
Figure 2C:
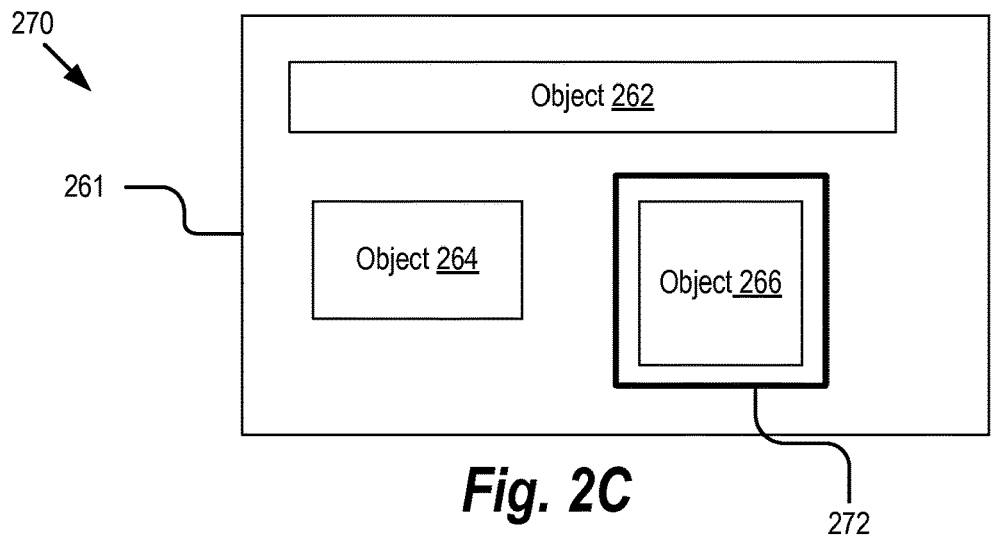
FIG. 2C illustrates an example embodiment of the web page of FIG. 2B that includes visual indications of SEO recommendations.
Figure 2D:
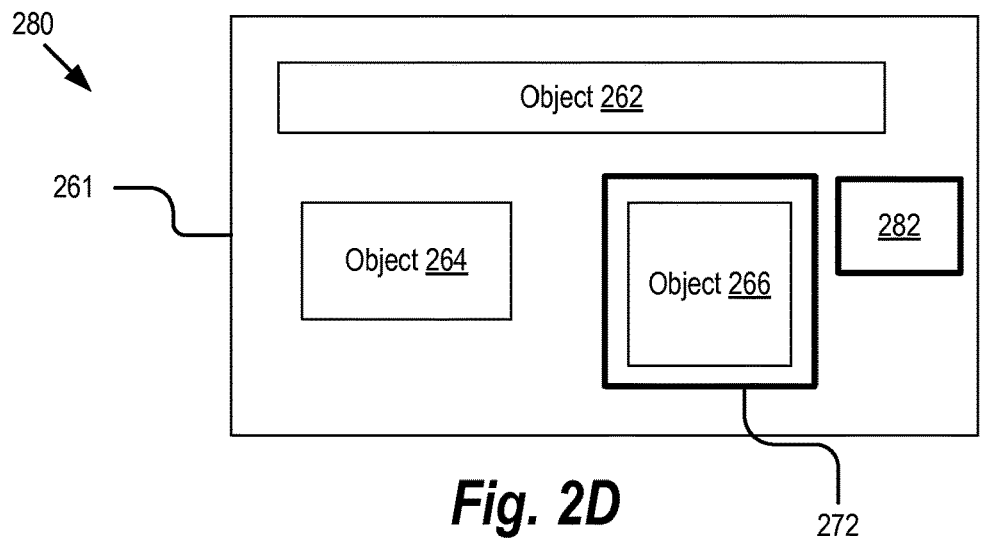
FIG. 2D illustrates another example embodiment of the web page of FIG. 2C that includes visual indications of SEO recommendations.

The SEO module 210 may be further configured to alter the program code of the web page 216 based on the one or more recommendations to include visual indications for the one or more recommendations. In particular, the SEO module 210 may be configured to alter the program code of the web page 216 such that when the program code of the web page 216 is rendered in a browser, such as the browser 212, the rendered web page 216 may include visual indications of the one or more recommendations. For example, a recommendation for the web page 216 may include a proper image tag for an image in the web page 216. The SEO module 210 may provide a visual indication of the recommendation by highlighting the image. The image may be highlighted by providing a border or lines around the image with a color that contrasts to the background of the web page 216 (e.g., a red border when the background of the web page 216 is blue). The image may also be highlighted by shading the image or by some other manner. In some embodiments, the visual indication may include text or may be non-textual. Example visual indications for recommendations are illustrated in FIGS. 2B-2D.

In some embodiments, a visual indication for a recommendation may be varied based on a type of the recommendation. For example, recommendations related to keywords may be presented in a first color, recommendations related to tags within the program code may be presented in a second color that is flashing, and recommendations related to an organization's internal policies may be presented in a third color. In some embodiments, a user may be able to control settings within the SEO module 210 so that the user may select visual indications for certain types of the recommendations.

In some embodiments, the recommendations may be ranked. The recommendations may be ranked based on one or more of: revenue increase associated with the recommendations, search engine performance increase associated with the recommendations, web page traffic increase associated with the recommendations, increase in conversion associated with the recommendations, increase in web-page-related actions associated with the recommendations, among others. In these and other embodiments, a visual indication for a recommendation may vary based on the rank for the recommendation. For example, a visual indication associated with a recommendation with a high rank may be given a bright noticeable color and flash while a visual indication associated with a recommendation with a low rank may be given a duller color and not flash.

In some embodiments, a visual indication for a recommendation may be associated with text concerning the recommendation. For example, for a recommendation associated with an image, the visual indication may include a border around the image on the web page. When a user selects, hovers over, or otherwise indicates an interest in the border around the image, the web page may overlay text over the image or other portion of the web page and may use the text to describe the recommendation.

After the SEO module 210 has altered the program code of the web page 216 to include one or more visual indications of one or more recommendations for the web page 216, the SEO module 210 may send the altered program code of the web page 216 back to the browser 212. The browser 212 may present the altered web page 216 to the user operating the computing device 211. For example, the browser 212 may present the web page 216 with the altered program code to the user so that the user may view the visual indications of the one or more recommendations for the web page 216.

The plugin module 214 may be further configured to receive an indication from the user operating the computing device 211. The indication may indicate to send the one or more recommendations associated with the web page 216 to the CMS 220 so that the CMS 220 may implement the one or more recommendations on the web page 216. For example, the plugin module 214 may ask the user for permission to allow the CMS 220 to implement the one or more recommendations on the web page 216. If the user agrees to implement the one or more recommendations for the web page 216 on the CMS 220, the plugin module 214 may send the indication to the SEO module 210. Responsive to receiving the indication, the SEO module 210 may determine a CMS identifier for the web page 216. The SEO module 210 may already retain a copy of the one or more recommendations for the web page 216 in a storage associated with the SEO module 210. The SEO module 210 may submit a request including the CMS identifier of the web page 216 and the one or more recommendations to the CMS 220. Alternatively or additionally, the plugin module 214 may send the altered program code of the web page 216 to the SEO module 210. The SEO module 210 may use the altered program code to identify the one or more recommendations generated by the recommendation module 114 and may send the one or more recommendations and the CMS identifier of the web page 216 to the CMS 220.

In some embodiments, the plugin module 214 may allow the user to select which recommendations to be implemented by the CMS 220. The plugin module 214 may send data identifying the selected SEO recommendations to the SEO module 210, causing the SEO module 210 to send a request including the selected SEO recommendations and the CMS identifier of the web page 216 to the CMS 220.

The CMS 220 may receive the request from the SEO module 210 and may implement the one or more recommendations on the web page 216 automatically or under the direction of a user associated with the CMS 220. The web page 216 may be an optimized web page for search engine optimization after the implementation of the one or more recommendations. The web page 216 may then be published or republished on the web server 106.

In some embodiments, the user operating the computing device 211 may be a member of an SEO team (or, another user) in an organization. The system 200 may allow the member of the SEO team to view published or non-published web pages for the organization and to perform SEO analysis for the web pages. The SEO team member may be able to view recommendations visually indicated for the web pages using the browser 212 and may decide whether to implement the recommendations for the web pages. The SEO team member may use the plugin module 214 to indicate that the recommendations may be implemented on the CMS 220. As a result, the SEO team member may schedule implementation of SEO recommendations for the web pages without having any detailed information about the CMS 220 or having access to the CMS 220. Thus, the system 200 may enable collaboration between SEO team members and content team members within an organization. The system 200 may further reduce time, steps, and efforts to implement SEO recommendations for web pages. Modifications, additions, or omissions may be made to the system 200 without departing from the scope of the present disclosure.

Alternatively or additionally, the system 200 may include the workflow engine 250. The workflow engine 250 is illustrated using dashed lines in FIG. 2A to indicate that the workflow engine 250 may be operable on one or more of the CMS 220, the SEO module 210, and the computing device 211. In some embodiments, the workflow engine 250 may be implemented as an add-on module or installable plug-in module in one or more of the CMS 220, a content authoring system, the SEO module 210, or another suitable system. Alternatively or additionally, at least part of the workflow engine 250 may be implemented as a software module integrated into a cloud marketing software architecture. In other embodiments, the workflow engine 250 may be implemented as a standalone application separate from the CMS 220 and the SEO module 210. More generally, the workflow engine 250 may be implemented in various platforms which are not limited to the platforms described herein.

In some embodiments, the workflow engine 250 may include a set of software components operating in a prescribed, algorithmically-determined, or user-controlled manner to inform and guide a workflow of activities. The workflow of activities may facilitate authors and/or editors in the CMS 220 to improve search engine performance associated with pages and/or page content. An example workflow performed by the workflow engine 250 is illustrated and described with reference to FIG. 3.

Example software components included in the workflow engine 250 may include, but are not limited to, (1) a component that may analyze content on a page; (2) a component that may provide assessments of search engine characteristics, page performance, and/or content element performance on the page; (3) a component that may provide competitive deep data about other pages and/or other web content from competitors (e.g., a component similar to a deep data module 442 of FIG. 4), where the other pages and/or web content may compete for search engine traffic with the page or content of the page; (4) a component that may provide recommendations or suggestions about various content elements on the page (e.g., a component similar to the recommendation module 114 of FIG. 1); (5) a component that may recommend ways to optimize the page and/or content on the page to enhance their search engine performance (e.g., a component similar to the recommendation module 114 of FIG. 1); (6) a component that may provide automated step-by-step instructions and/or guidance describing how to optimize the page or content components on the page; (7) a component that may provide checkpoints during the authoring or editing process so that authors or editors in the CMS 220 may track their progress; (8) a component that may allow authors and/or editors to save draft or final versions of changes; (9) a component that may implement permission and governance rules (e.g., a component similar to a governance rule module 428 of FIG. 4); (10) a component that may allow users to save or submit changes; (11) a component that may allow users to revert or cancel previously submitted changes; and (12) a component that may track or report available tasks, tasks that are already completed, and/or subsequent performance resulting from completion of the tasks, etc. In these and other embodiments, the workflow engine 250 may include various combinations of the software components described herein.

In some embodiments, the workflow engine 250 may include a communication interface that may interact and communicate with one or more of the CMS 220, a content authoring system, and/or the SEO module 210. For example, the workflow engine 250 may use the communication interface to communicate with APIs, system calls, or other interface logic in the CMS 220 or the SEO module 210 during implementation of a workflow of activities. The workflow engine 250 may use the communication interface to exchange data with the CMS 220, the content authoring system, and/or the SEO module 210.

In some embodiments, the workflow engine 250 may create task assignments that may be shared between the SEO module 210 and the CMS 220. The shared task assignments may be sent to the SEO module 210 and/or the CMS 220 for execution. The shared task assignments may be synchronized with workflows, tasks, scheduling arrangements in the SEO module 210 and/or the CMS 220. For example, the CMS 220 or the SEO module 210 may execute part of or all of the activities in the workflow and may forward execution results to the workflow engine 250.

In some embodiments, the workflow engine 250 may analyze pages being created or edited in the CMS 220. The pages may be in various stages, such as a pre-release stage, a test and verification stage, or a pre-production stage. In some embodiments, the pages being edited may be internal pages in the CMS 220 that have been mapped to corresponding public pages published on web sites. The workflow engine 250 may analyze characteristics of the pages including, but not limited to, pages being authored or edited in the CMS 220, pages being pushed into production, and pages recently pushed into production, etc. The workflow engine 250 may provide content teams related to the CMS 220, SEO teams related to the SEO module 210, and/or management teams in an enterprise with a broader context that describes how the enterprise's web site performs in organic search or other marketing channels and how the content optimization workflow impacts the performance of the web site in organic search or other marketing channels.

In some embodiments, the workflow engine 250 may generate a summarized report or log file including web transaction histories. The report or log file may include information related to content optimization for search performance that are recommended and executed by users of the CMS 220. For example, information in the report or log file may be categorized by individual content authors or editors who have worked on a particular page, groups of the individual content authors or editors, groups of pages, keywords, keyword groups, and a variety of other filters. Alternatively or additionally, the report or log file may also include performance measurement data for pages that were optimized for search or any other purpose. The performance measurement data may measure the performance of the pages after the pages are published on public web sites.

In some embodiments, the workflow engine 250 may tag pages and/or page content that are optimized and may create metadata related to the tagged pages and/or page content. The workflow engine 250 may associate the tags and/or metadata with the pages and/or page content. The associations between the tags, metadata, and the tagged pages (or page content) may facilitate analyzing SEO performance of the pages published on web sites. The tags and metadata may be used to generate reports describing performance and activities associated with the optimized pages and/or page content.

FIG. 2B illustrates an example graphic representation 260 including an example web page 261 without visual indications of SEO recommendations, arranged in accordance with at least some embodiments described herein. The web page 261 may include objects 262, 264, and 266. For example, the object 262 may be a header, the object 264 may be text, and the object 266 may be an image.

FIG. 2C illustrates an example graphic representation 270 including the web page 261 of FIG. 2B with visual indications of SEO recommendations, arranged in accordance with at least some embodiments described herein. Software code of the web page 261 may have been altered to include a visual indication 272 that describes a recommendation associated with the object 266. The visual indication 272 may form a border around the object 266. The visual indication 272 may indicate that an SEO recommendation for altering the object 266 exists so that the object 266 may be optimized for search engines. For example, the object 266 may be an image that does not have an image tag, or an image tag associated with the image may be incorrect or incomplete. The visual indication 272 around the object 266 may be highlighted using different colors to indicate whether the recommendation is associated with a missing tag, an incorrect tag, or an incomplete tag.

In some embodiments, a color of the visual indication 272 may be different from the portion of the web page 261 surrounding the object 266 so that the visual indication 272 is not obscured from the portion of the web page 261. In some embodiments, the visual indication 272 may include a hyperlink so that the visual indication 272 may be linked to a web page that includes a recommendation associated with the visual indication 272. Alternatively, the visual indication 272 may be linked to an SEO system that altered the web page 261. Modifications, additions, or omissions may be made to the web page 261 without departing from the scope of the present disclosure.

FIG. 2D illustrates another example graphic representation 280 of the web page 261 of FIGS. 2B and 2C with visual indications of SEO recommendations, arranged in accordance with at least some embodiments described herein. Software code of the web page 261 may have been altered to include a visual indication 282 (e.g., a text overlay) that describes a recommendation associated with the object 266. The text overlay may be opaque except for the text. The text in the text overlay may be in black color or may be in a color different from the portion of the web page over which the text is overlaid. In some embodiments, the text overlay may be a box that includes text. The box may be filled with solid color that is distinct from the color of the web page. In some embodiments, the text overlay may include a link to an information page related to the recommendation. Alternatively or additionally, the text overlay may include a link to an SEO system that altered the web page 1301 to include the text overlay.

Alternatively or additionally, the visual indication 282 may include another overlay object, such as text or a symbol, associated with a recommendation for a portion of the software code that is not presented by a browser and thus not associated with the objects 262, 264, and 266. For example, the visual indication 282 may be associated with recommendations for meta-descriptions. In some embodiments, the visual indication 282 may include a portion of the program code associated with the recommendation. Modifications, additions, or omissions may be made to the web page 261 without departing from the scope of the present disclosure.

Figure 3:
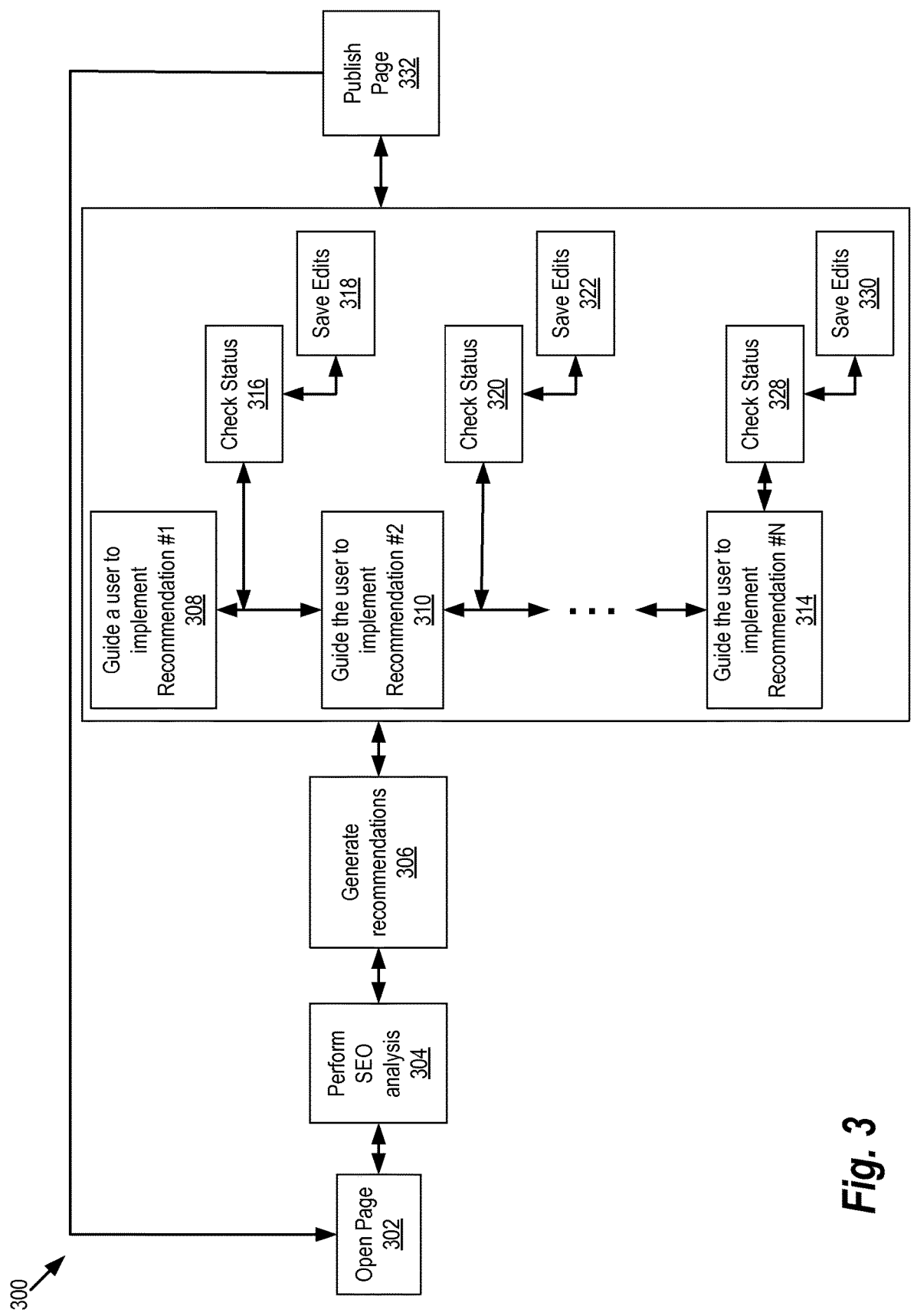
FIG. 3 illustrates an example embodiment of a workflow for implementing recommendations on a web page.

FIG. 3 illustrates an example workflow 300 for implementing recommendations on a web page, arranged in accordance with at least some embodiments described herein. The workflow 300 may be implemented by the workflow engine 250 of FIG. 2A and/or other components of the system 200. The workflow 300 may begin by opening 302 the web page using a browser or another application. The workflow 300 may include performing 304 SEO analysis for the web page and generating 306 recommendations for the web page. For example, the workflow engine 250 may instruct the SEO module 210 to perform SEO analysis for the web page. The workflow engine 250 may receive recommendations for improving SEO performance of the web page from the SEO module 210.

The workflow 300 may include guiding a user to implement the recommendations. The user may be a member from a content team, a member from an SEO team, or a user from an organization associated with the web page. For example, the workflow 300 may include guiding 308 the user to implement Recommendation #1, checking 316 a status of the web page when Recommendation #1 is implemented on the web page, and saving 318 edits related to the implementation of Recommendation #1. In some embodiments, edits to content elements on the web page may be analyzed, and real-time guidance may be provided to the user as edits to the content elements are being entered. Alternatively or additionally, the workflow 300 may include guiding 310 the user to implement Recommendation #2, checking 320 the status of the web page when Recommendation #2 is implemented, and saving 322 edits related to the implementation of Recommendation #2. Alternatively or additionally, the workflow 300 may include guiding 314 the user to implement Recommendation # N, checking 328 the status of the web page when Recommendation # N is implemented, and saving 330 edits related to the implementation of Recommendation # N.

After implementing one or more recommendations on the web page, the workflow 300 may include publishing 332 or republishing the web page. In these and other embodiments, operations in the workflow 300 may repeat. For example, the workflow 300 may include reopening the web page and then continuing to perform operations similar to those described above.

At various points in the workflow 300, the workflow engine 250 may create and send alerts and/or reports to other users associated with the workflow 300, including managers, members in content teams, members in SEO teams, and/or other relevant users within the same organization or outside the organization. The various points in the workflow 300 may include a start point of the workflow 300, an end point of the workflow 300, intermediate points, a point when the web page is approved for publishing or republishing to a web site, and/or other points in the workflow 300. In these and other embodiments, the workflow 300 may also share the implementation of the recommendations with users relevant to the workflow 300. The operations in the workflow 300 may be sequenced in any order including, but not limited to: (1) a predetermined order; and (2) an order configured by an author, an editor of the web page, or another member of the organization (e.g., a manager of a content team, a member of the content team responsible for managing SEO for the organization). Modifications, additions, or omissions may be made to the workflow 300 without departing from the scope of the present disclosure.

Figure 4:
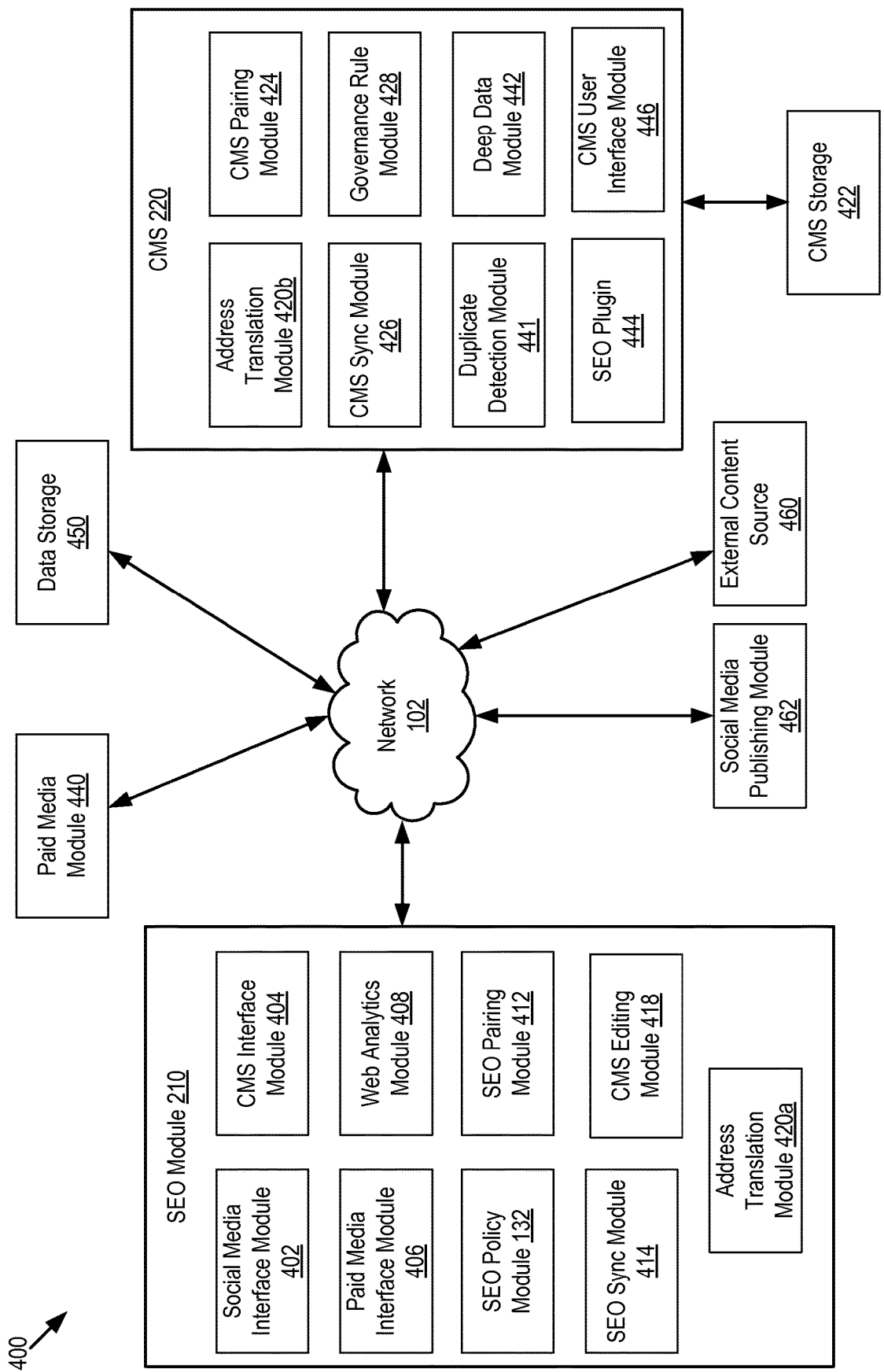
FIG. 4 illustrates an example embodiment of a system including the CMS of FIG. 2A integrated with the SEO module of FIG. 2A and other third-party systems.

FIG. 4 illustrates an example content optimization system 400 that integrates the CMS 220, the SEO module 210 of FIG. 2A, and multiple third-party systems (e.g., 440, 462), arranged in accordance with at least some embodiments described herein. In particular, the system 400 may include the SEO module 210, the CMS 220, a social media publishing module 462, a paid media module 440, a data storage 450, and an external content source 460 connected through the network 102 of FIGS. 1 and 2.

The social media publishing module 462 may be configured to generate and/or publish social media items. The social media items may include blogs, micro blogs, videos, posts, etc. The paid media module 440 may be configured to generate and/or publish paid advertisement in networks such as the Internet. The paid advertisements may include pay-per-click advertisements and other types of advertisements.

The CMS 220 may be configured to generate and/or publish digital content such as web pages. The digital content may be part of a single domain or multiple domains. The digital content may form multiple web sites or be part of a single web site. In some embodiments, the CMS 220 may include digital content templates such as web page templates for individual web pages or for groups of web pages on a web site, as well as multiple web sites, domains, or sub-sites and sub-domains. The CMS 220 may interface with the data storage 450 or a CMS storage 422. A content library may provide the items, such as images, text, videos, among other types of data for integration into the digital content.

Additionally, the CMS 220 may be used in various implementation environments including creation, production, and release of the digital content. For example, the CMS 220 may be used during development or "sandbox" environments, testing environments, certification environments, and pre-production staging environments, as well as full-production, live environments that expose users, such as people searching a network available to the general public (e.g., the internet), to the digital content. Furthermore, in some embodiments, the CMS 220 may generate a page with an internal identifier (ID) (e.g., a temporary URL or an internal URL), which may be used for internal purposes before publication. The internal ID may be subsequently modified or otherwise re-formatted to generate a public ID (e.g., an external URL or a public URL), which may be visible to users and other systems (e.g., the SEO module 210). Thus, the internal ID (e.g., the temporary URL) and the public ID (e.g., the external URL) may appear in a look-up table that translates the identifiers for the digital content. An example look-up table may include an internal-public-address table described below.

In addition, in some embodiments, the CMS 220 may be linked to the data storage 450 or the CMS storage 422. The data storage 450 and the CMS storage 422 may store items such as images, product catalog, titles, etc. that may be included in digital content produced by the CMS 220.

In some embodiments, the CMS 220 may include an address translation module 420b, the CMS pairing module 424, a CMS synchronization (sync) module 426, the governance rule module 428, the duplicate detection module 441, the deep data module 442, an SEO plug-in module 444, and a CMS user interface module 446. The modules of the CMS 220 are described below in more detail. Modifications, additions, or omissions may be made to the CMS 220 without departing from the scope of the present disclosure.

The social media publishing module 462 and the paid media module 440 are examples of third party systems that may be integrated with the SEO module 210 and are not meant to be limiting. In some embodiments, the CMS 220 may also be referred to as a third party system for the SEO module 210. Other third party systems might include a web analytics system, a social media network, a social media analytics and metrics system, or some combination thereof, for instance.

In general, each of the third party systems 220, 462, and 440 are configured to communicate with the SEO module 210. Communications between the third party systems 220, 462, and 440 and the SEO module 210 may include communication of digital content from the third party systems 220, 462, and 440 to the SEO module 210 for analysis, reception of recommendations (discussed below) based on the analysis from the SEO module 210, and reporting of information pertaining to the recommendations to the SEO module 210. The communications between the third party systems 220, 462, and 440 and the SEO module 210 may occur via an API in some embodiments.

In some embodiments, the SEO module 210 may include one or more interface modules 402, 404, and 406 (collectively, interface modules), a web analytics module 408, the SEO policy module 132, the SEO pairing module 412, an SEO sync module 414, a CMS editing module 418, and an address translation module 420a. In these and other embodiments, the SEO module 210 may include some of the aspects of the SEO system 100 of FIG. 1. For example, the SEO module 210 may include the correlator 104, the deep index engine 108, the receiving module 112, the recommendation module 114, the user interface 116, the optimization module 120, and the sending module 130. One or more of these components of FIG. 1 may be integrated into the interface modules 402, 404, and 406, the web analytics module 408, the SEO policy module 132, or may be an independent module in communication with the interface modules 402, 404, and 406, the web analytics module 408, or the SEO policy module 132. Modifications, additions, or omissions may be made to the SEO module 210 without departing from the scope of the present disclosure.

In some embodiments, the SEO module 210 may analyze content included in the external content source 460. The external content source 460 may include word documents, third party documents, documents publicly available, products catalogs, etc. Bulk digital content may be received from the external content source 460. For example, bulk digital content such as web pages may be generated or auto-generated by an automatic service and directly submitted to the SEO module 210. The SEO module 210 may perform an analysis of the bulk digital content based on the SEO policy, and recommendations may be generated based on the analysis. The performance of the analysis on the bulk digital content may enable capturing of problems before the bulk digital content is integrated into published digital content.

Each of the one or more interface modules 402, 404, and 406 may be configured to interface with one or more third party systems 220, 462, and 440. In these and other embodiments, the SEO module 210 may include a social media interface module 402, which may be configured to interface with the social media publishing module 462; a CMS interface module 404, which may be configured to interface with the CMS 220; and a paid media interface module 406, which may be configured to interface with the paid media module 440. The interface modules may be configured to receive digital content and reports from the third party systems 220, 462, and 440 and to communicate recommendations based on analysis of the digital content to the third party systems 220, 462, and 440.

The digital content may vary based on the third party systems 220, 462, or 440 in which the digital content resides or by which the digital content is controlled. For example, digital content from the CMS 220 may include, but is not limited to, pre-published web pages, web page templates, published web pages, published web sites, portions of published web sites, etc. Digital content from the paid media module 440 may include published advertisements, advertisements in development, etc.

The SEO policy module 132 may enable definition of an SEO policy. The SEO policy may generally include one or more rules, filters, or criteria that pertain to SEO data and the digital content upon which recommendations may be generated. The SEO policy may be established according to a certain number of filters. For instance, an SEO policy may include four, eleven, forty, or more filters that the digital content is analyzed against. The SEO policy may, in some embodiments, be a part of or contribute to a centralized policy management system (described above).

The filters may be defined or selected by a third party or may be included as a default provided by an SEO company. The filters may be customized to a specific portion of digital content such as an individual web page or across all digital content of a third party. In some embodiments, a third party may include "flags" in portions of the digital content that indicate which of the filters to apply. Additionally, the filters may include considerations of separate languages, jurisdictional norms, etc. The filters may be selected and modified in a user interface including one or more checklists with the capability to enable or disable the filters at any time.

When an analysis of the digital content is performed, the SEO policy may be applied to determine with which of the filters the digital content complies and with which of the filters the digital content does not comply. This may create a "binary" process in which the analysis results are either a "yes" or a "no." For instance, an SEO policy with eleven filters may return a result indicating that digital content complied with only four of the eleven filters. The recommendations generated by the SEO module 210 may relate to bringing the failed filters (i.e., the seven filters in this example) into compliance with the SEO policy. Alternatively, the results of applying the SEO policy may be a score, such as "% complete" or "% of opportunity addressed" or level of completion or quality, such as "Low," "Medium," or "High" or some combination of binary, scores, and levels.

In these and other embodiments, the compliance of the SEO policy may result in an updated score where the scores are changed dynamically. For example, when a change is made to the digital content, without the user submitting, submitting for approval, saving, finalizing, or otherwise indicating that a change has occurred besides entering the change, the SEO module 210 may detect the change and automatically update the score. As a result, a user may receive an up-to-date status of the percentage of changes that may be implemented on a block of working web pages, such as one or more web pages, as the user works on a block or content element of a page in the CMS 220 or a content authoring environment.

The web analytics module 408 may be configured to collect SEO data and/or other information from the web or other sources pertaining to the digital content. The web analytics module 408 may then perform an SEO analysis of the SEO data and/or the digital content.

The web analytics module 408 may then communicate the SEO data and the analysis to the interface modules. In some embodiments, the interface modules may apply the SEO policy to the SEO data to analyze the digital content. The interface modules may use one or more of the modules described with respect to FIG. 1 in performing the analysis. The interface modules may generate recommendations for the third party systems 220, 462, and 440. Specifically, the interface modules may communicate with the web analytics module 408 and the SEO policy module 132 to analyze the digital content in view of the SEO data to generate one or more recommendations regarding the digital content. The interface modules may perform the analysis on the digital content by applying the SEO policy to the SEO data collected from the Internet. The recommendations may generally determine how to better or best optimize SEO objects that may be included in the digital content of the third party systems 220, 462, and 440.

In some embodiments, the interface modules may locally (i.e., at the SEO module 210) execute the recommendations and push executed recommendations to the third party systems 220, 462, and 440. Additionally or alternatively, the interface modules may execute a portion or a subset of the recommendations and may push the executed portion or the executed subset of recommendations to the third party systems 220, 462, and 440, while managing the execution by the third party systems 220, 462, and 440 of the remainder of the recommendations for remote execution (i.e., at the third party systems 220, 462, and 440). Additionally or alternatively, the interface modules may manage the recommendations to determine which of the recommendations have been remotely executed.

The third party systems 220, 462, and 440 may communicate one or more reports to the interface modules indicating which of the recommendations have been remotely executed and SEO results of the recommendations. The SEO results may include progress or status of recommendations, inability to complete recommendations, impact on SEO metrics due to execution, timelines regarding status or expected completion, etc. In some embodiments, the interface modules may additionally or alternatively be configured to estimate the SEO results and to communicate the SEO results to the third party systems 220, 462, and 440 or a user.

In some embodiments, the recommendations or changes may be communicated to one or more of the third party systems 220, 462, and 440. At the third party systems 220, 462, and 440, the recommendations may be proposed to the third party and executed subject to the approval or adjustment of the third party and/or the third party systems 220, 462, or 440.

In some embodiments, the interface modules may additionally or alternatively be configured to control execution of the recommendations. For example, the third party systems 220, 462, or 440 may not be able to complete a certain recommendation until an interface module receives an instruction to proceed. Another example may include a generalized recommendation that requires later approval by the interface modules.

In some embodiments, the interface modules may additionally or alternatively be configured to determine metrics relevant to the SEO policy and/or the digital content. For example, the social media interface module 402 may be configured to determine social media metrics relevant to the digital content controlled by the social media publishing module 462.

For example, the CMS 220 may be configured to receive the recommendations from the CMS interface module 404 and to set the recommendations in action. The CMS 220 may send results back to the CMS interface module 404 regarding the status of the recommendations. The SEO results may be sent to the CMS interface module 404 once the recommendations have been assigned, completed, opened longer than a predetermined period, closed out, etc. The CMS interface module 404 may summarize the recommendations and may provide a report regarding the recommendations to a user. The report regarding the recommendations may include an expected impact of the completion or non-completion of the recommendations, a time period the recommendations took to complete, among other information.

In some embodiments, the CMS 220 may not be able to complete certain recommendations until the CMS 220 reports to the CMS interface module 404 and receives an instruction to proceed from the CMS interface module 404. For example, the CMS 220 may determine changes to a web site. The changes may not be implemented until the CMS interface module 404 approves the changes to the web site.

As depicted in FIG. 4, the analysis of the digital content occurs at the SEO module 210. However, this is not meant to be limiting, in some alternative embodiments, the analysis of the digital content occurs in one or more of the third party systems 220, 462, and 440.

In addition to analyzing the digital content to generate recommendations, the digital content may be analyzed to detect a pattern in two or more recommendations. The pattern may include an association between a specific digital content template or a type of digital content template, a whole section of web sites, a specific content team, a sub-domain, a type of tag, a title, or digital content with a specific problem. The specific problem, which continues to be generated in a duplicate recommendation, may indicate a larger problem with digital content or that a problem exists in the digital content across multiple domains, web sites, content teams, etc. Thus, by detecting the pattern in two or more recommendations, a recommendation regarding the specific problem may be generated and may be applied to the multiple domains, web sites, etc.

The interface modules of the SEO module 210 may share information and may collaborate when issuing recommendations to the third party systems 220, 462, and 440. Accordingly, in some embodiments execution of the recommendations related to the digital content from the systems 220, 462, or 440 may be controlled by the SEO module 210. By controlling the digital content at least in part by the SEO module 210, increased collaboration and better SEO results may result compared to similar third party system(s) controlled independently or without the SEO module 210.

In some embodiments, the SEO module 210 may also act as an interface between the CMS 220, the social media publishing module 462, and the paid media module 440. For example, the CMS 220 may provide recommendations and/or information to the paid media module 440 or the social media publishing module 462. Here the recommendations may be routed through the SEO module 210, allowing the SEO module 210 to provide the interface between these different systems.

In some embodiments, pairings pages with keywords (also referred to as keyword-page pairings) may be performed by the CMS pairing module 424 in the CMS 220. Alternatively or additionally, at least part of the keyword-page pairings may be performed by the SEO pairing module 412 in the SEO module 210. For example, the SEO pairing module 412 may pair keywords to pages outside the CMS 220. The keyword-page pairings managed by the SEO pairing module 412 may exist parallel to, along with, or in place of the keyword-page pairings maintained internally by the CMS 220. The keyword-page pairings generated by the SEO pairing module 412 may be inserted into the CMS 220 by automatically exchanging or synchronizing information between the SEO module 210 and the CMS 220. In these and other embodiments, the SEO pairing module 412 in the SEO module 210 may cooperate with the CMS pairing module 424 in the CMS 220 to perform keyword-page pairings for web pages.

The SEO pairing module 412 may be configured to determine an association between one or more keywords and a public page. A public page may include a published web page. For example, a public page may include a web page published on the web server 106. The public page may include a public identifier such as a public address (e.g., a public URL) of the page. The SEO pairing module 412 may generate a keyword-public-address entry describing the association between the one or more keywords and the public page. For example, the keyword-public-address entry may describe an association between the one or more keywords and a public address (e.g., a public URL) of the public page. The SEO pairing module 412 may create a keyword-public-address mapping table to include different keyword-public-address entries for different public pages. An example keyword-public-address mapping table is illustrated in Table 1 below.

TABLE 1

Keyword-Public-Address Mapping Table

| Public URLs | Keywords |
|---|---|
| www.store.com/saledresses | dresses, semi-formal |
| www.store.com/saleblazers | blazers |

An address translation module 420 (e.g., the address translation module 420a or 420b) may translate or interpret a public address of a public page used by the SEO module 210 into an internal address used by the CMS 220 and vice versa, since the CMS 220 may have a different URL address path (e.g., an internal URL) for an internal page that corresponds to the public page. The internal page may be an internal version of the public page. The internal URL address may be used for publishing control, data storage, and indexing purposes within the CMS 220, while the public URL address may be used to publish page content on a publicly-accessible web site and to display page content on the web site to visitors of the web site.

Mapping public addresses used by the SEO module 210 with internal addresses used by the CMS 220 may facilitate incorporating keyword-page pairing information from the SEO module 210 to the CMS 220. In some embodiments, the mapping between public addresses and internal addresses may be performed by the address translation module 420a in the SEO module 210. Alternatively, the mapping between public addresses and internal addresses may be performed by the address translation module 420b in the CMS 220.

For example, the address translation module 420a or 420b may convert public addresses of public pages to internal addresses of corresponding internal pages, and vice versa. The address translation module 420a or 420b may create an address mapping file (e.g., an internal-public-address mapping table) that may associate public URLs used by the SEO module 210 to their corresponding internal URLs used by the CMS 220. An example address mapping file is listed in Table 2 below. In some embodiments, the address mapping file may be created automatically without user intervention. Alternatively, a user may provide input data to create the address mapping file. For example, a user may specify associations between the public URLs and the corresponding internal URLs. The address mapping file may be maintained by both the SEO module 210 and the CMS 220. The SEO sync module 414 may cooperate with the CMS sync module 426 to synchronize the address mapping file between the SEO module 210 and the CMS 220.

TABLE 2

Internal-Public-Address Mapping File

| Public URLs | Corresponding Internal URLs |
|---|---|
| www.store.com/saledresses | staging.store.com/cf#/salesdresses |
| www.store.com/saleblazers | staging.store.com/cf#/saleblazers |

In some embodiments, the address translation module 420a or 420b may map a public address of a page with an internal address of the page by reading a configuration file of the page from the CMS 220. The configuration file may include a vanity URL that is applied to the page. The configuration file may include a mapping between a fully qualified URL and the vanity URL. The fully qualified URL may be the public address of the page, and the vanity URL may be the internal address of the page.

In some embodiments, the address translation module 420*a* or 420*b* may read web or application server configuration files, such as ".htaccess" or "mod_alias." The web or application server configuration files may include directory-level configuration files used to re-write URLs. From the web or application server configuration files, the address translation module 420*a* or 420*b* may determine how an internal URL is mapped to a public URL, and vice versa.

In some embodiments, the address translation module 420*a* or 420*b* may configure one or more rules (e.g., regular expression rules, conditional rules, or some combination thereof) that define a URL structure for a web site. The address translation module 420*a* or 420*b* may use the one or more rules to map an internal URL to a corresponding public URL, and vice versa.

In some embodiments, the address translation module 420*a* or 420*b* may receive content from various marketing systems. If content on a public page in a marketing channel is similar to or the same as content on an internal page in the CMS 220, the address translation module 420*a* or 420*b* may determine that the public page corresponds to the internal page and may map a public URL of the public page to an internal URL of the internal page, and vice versa.

In some embodiments, advanced mechanisms (e.g., machine learning techniques) may be used to learn patterns related to the address mapping. For example, in the CMS 220 an author of a page may write multiple versions of the page with the same or similar content depending on a target device where the page may be rendered. A target device may include a laptop computer, a smartphone, a tablet computer, or another suitable electronic device. The advanced mechanisms may be used to learn that the multiple versions of the page may actually include the same or similar content for the same page. As another example, the author may write multiple versions of the page with similar content, and the content is slightly varied for the multiple versions based on customized profiles such as locations and personal preferences. The advanced mechanisms may be used to learn that the multiple versions of the content may actually be content of the same page.

In some embodiments, the SEO pairing module 412 may further create one or more keyword-page pairing entries based on the address mapping file and the keyword-public-address mapping table. The SEO pairing module 412 may create a keyword-page pairing table including one or more keyword-page pairing entries related to one or more pages. An example keyword-page pairing table generated from the above Table 1 and Table 2 is illustrated in Table 3.

TABLE 3

Keyword-Page Pairing Table

| Corresponding Internal URLs | Public URLs | Keywords |
|---|---|---|
| staging.store.com/cf#/salesdresses | www.store.com/saledresses | dresses, semi-formal |
| staging.store.com/cf#/saleblazers | www.store.com/saleblazers | blazers |

In some embodiments, a keyword-page pairing entry related to a page may include a public URL, one or more keywords associated with the public URL, and/or an internal URL corresponding to the public URL. Different keyword-page pairing entries may have different combinations of keywords for the corresponding pages. For example, a first keyword-page pairing entry may include a single keyword associated with a first page, a second keyword-page pairing entry may include more than one keyword associated with a second page, a third keyword-page pairing entry for a third page, and a fourth keyword-page pairing entry for a fourth page may share one or more keywords in common.

In some embodiments, the SEO sync module 414 may cooperate with the CMS sync module 426 to synchronize the keyword-page pairing table (or keyword-page pairing entries) from the SEO module 210 to the CMS 220, so that the CMS 220 may use the keyword-page pairing table to optimize pages listed in the keyword-page pairing table. The keyword-page pairings in the table may be populated and manifested inside the CMS 220. More specifically, the CMS 220 may use the keyword-page pairings from an external system (such as the SEO module 210) to associate keywords with corresponding paired pages and to determine how to present information to search engines that crawl and index the pages. For example, for a keyword-page pairing entry that pairs a keyword with a page, the CMS 220 may insert the keyword to a page title, a body of text, a meta description, a body tag, H1 tags, and/or H2 tags of the page.

As another example, a keyword may be assigned to a targeted preferred landing page (PLP) of a web site. Alternatively, a keyword may be paired with an actual top page of the keyword on the web site. In some embodiments, these two ways of pairing keywords with pages may be performed on various pages at the same time. A user may determine whether a keyword may be paired with a preferred landing page rather than a top landing page (TLP) of the keyword. For example, for a particular keyword, if the user wants to migrate visitors from a top landing page to a different page such as a preferred landing page, the user may determine to pair the particular keyword with the preferred landing page rather than the top landing page. In another example, the user may want to split visitors to different pages for marketing purposes. There may be complex rules and policies for prioritizing when and where to assign keywords to any specific set(s) of preferred landing pages and top landing pages.

Alternatively, the SEO sync module 414 may cooperate with the CMS sync module 426 to synchronize the keyword-public-address mapping table from the SEO module 210 to the CMS 220, so that the CMS pairing module 424 may use the keyword-public-address mapping table to generate keyword-page pairings as described below.

The address translation module 420*b* may use one or more internal rules of the CMS 220 to create an address mapping file (e.g., an internal-public-address mapping table) for mapping internal addresses of pages to public addresses of the pages. The internal-public-address mapping table may include a first column listing internal URLs and a second column listing respective public URLs that correspond to the internal URLs. An internal rule of the CMS 220 may define how to transform an internal URL to a corresponding public URL.

The CMS pairing module 424 may generate keyword-page pairings based on the keyword-public-address mapping table and the internal-public-address mapping table. For example, the CMS pairing module 424 may align the keyword-public-address mapping table with the internal-public-address mapping table based on common public URLs included in both mapping tables and may generate keyword-page pairings from the table alignment. An example of generating keyword-page pairings based on a keyword-public-address mapping table and an internal-public-address mapping table is illustrated with reference to FIGS. 10A and 10B. The keyword-page pairings may pair internal URLs from the internal-public-address mapping table with keywords from the keyword-public-address mapping table, where a corresponding internal URL and one or more keywords paired with the corresponding internal URL are associated with a common public URL mapped to the internal URL.

For example, the CMS pairing module 424 may determine a first entry in the internal-public-address mapping table and a second entry in the keyword-public address mapping table, where the first entry and the second entry are associated with a common public page. The first entry may include an internal URL of an internal page and a public URL of the common public page that corresponds to the internal page. The second entry may include the public URL of the common public page and one or more keywords paired with the common public page. The CMS pairing module 424 may establish an association between the first entry and the second entry so that the internal URL in the first entry is paired with the one or more keywords in the second entry. For example, the CMS pairing module 424 may use a pointer, a field, or a link that connects the first entry to the second entry.

Because the address translation module 420b may utilize the CMS's internal rules to automatically map internal URLs to public URLs, a user may not need to manually map the internal URLs to the public URLs in a separate step. The SEO module 210 and the CMS 220 may exchange information on a page level after mapping internal URLs with external public URLs using internal rules of the CMS 220. The CMS pairing module 424 may associate a keyword that is paired with a public page with an internal URL that corresponds to the public page. As a result, the SEO module 210 and the CMS 220 may seamlessly populate information configured to pair a keyword with an internal page used in the CMS 220. For example, for an existing public page that a user associated with the SEO module 210, for which the user is trying to optimize for search, and for which the user has selected one or more keywords to pair with, the automated mapping between the public URL and the corresponding internal URL may facilitate a process of synchronizing keyword-page pairings between the SEO module 210 and the CMS 220. Efforts to apply pairings of keywords and pages inside the CMS 220 may also be simplified.

Thus, the keyword-page pairing technology described herein may allow a user to work more efficiently and with fewer errors when trying to leverage how to pair keywords with pages. The keyword-page pairings may be implemented efficiently to save time and money for an organization. For example, an entire workflow may be followed more quickly with no need to manually translate internal URLs to public URLs. As a result, SEO performance of a page may be optimized in an earlier stage of the page's lifecycle. More visitor traffic and conversion events may be achieved for the page or a web site hosting the page. The keyword-page pairing technology described herein may allow the user to implement keyword recommendations for various elements on a page more readily and quickly and to reduce or eliminate error rates in the process of associating keywords with pages. In addition, since the keyword-page pairing technology may be implemented based on internal rules in the CMS 220, lower internal friction and better overall team coordination may be achieved within the CMS 220.

The SEO sync module 414 and the CMS sync module 426 may cooperate with each other to perform bidirectional synchronization between the SEO module 210 and the CMS 220. As described above, the SEO sync module 414 may cooperate with the CMS sync module 426 to synchronize keyword-page pairings, keyword-public-address mapping tables, and/or keyword-page pairing tables between the SEO module 210 and the CMS 220. The bidirectional synchronization may synchronize various items between the SEO module 210 and the CMS 220 including, but not limited to, SEO objects, images, videos, social media posts, metadata tags, counters, competitive deep data, edits to pages, and other information shared between internal pages and corresponding public pages.

In some embodiments, the bidirectional synchronization between the SEO module 210 and the CMS 220 may be performed on a page level. For example, changes to an internal page made by an author or editor on the CMS 220 may be synchronized with a corresponding public page on the SEO module 210, so that the corresponding public page may be modified automatically according to the changes made to the internal page. Example changes may include, but are not limited to, modifying a keyword-page pairing for a page, correcting a spelling of a keyword, and/or translating a keyword from a first language to a second language, etc. As another example, an author or editor on the CMS 220 may determine one or more internal URLs that do not have keywords to pair with. The author or editor may add one or more keywords to pair with the one or more internal URLs. The CMS sync module 426 and the SEO sync module 414 may cooperate to synchronize the one or more keywords between the CMS 220 and the SEO module 210, so that one or more public URLs on the SEO module 210 that correspond to the one or more internal URLs are modified to pair with the one or more keywords added by the author or editor on the CMS 220.

The bidirectional synchronization between the SEO module 210 and the CMS 220 may be implemented in various ways. For example, the bidirectional synchronization may be implemented using APIs and/or a plug-in that may control the exchange of data between the SEO module 210 and the CMS 220. The plug-in may connect a CMS API to an SEO API. As another example, the synchronization may be implemented using a batch data transfer exchange. A batch report may be generated by one system and a file transfer protocol ("FTP") process may be used to upload the batch report to another system. The data in the batch report may be used by one system or the other system to update fields and files in the respective systems. It will be appreciated that the data exchange and synchronization between the SEO module 210 and the CMS 220 may be implemented using any other appropriate techniques.

In some embodiments, the SEO module 210 and the CMS 220 may be integrated into a single system. As a result, synchronization between the SEO module 210 and the CMS 220 may be implemented as synchronization between components within the same system. For example, the SEO module 210 may reside on the CMS 220 so that the CMS 220 may incorporate SEO functionality provided by the SEO module 210. The SEO functionality may include, but is not limited to, executing keyword searches and competitor page crawls, pulling data about backlinks and social channel data, generating organic search ranking reports, backlinking profiles, providing organic search optimization recommendations, and/or managing workflow tasks for organic search optimization, or some combination thereof.

The implementation of the synchronization between the SEO module 210 and the CMS 220 may be conceptually similar, whether it involves synchronization between separate systems or synchronization between components in the same system. For example, regardless of how the synchronization is implemented, the system 400 may be capable of identifying and/or performing optimizations that are consistent between internal URLs and external URLs. Competitive information derived from web sites and search engine crawls may be incorporated into pages on the CMS 220 so that authors and editors may optimize the pages for search channels. With synchronization and coordination across the SEO module 210 and the CMS 220, it may be easier for authors and editors on the CMS 220 to pair keywords with pages, to optimize content on pages using the keyword-page pairings, and to maximize SEO performance of web page content for the search channels.

The CMS editing module 418 may be configured to edit a page that resides on the CMS 220 from the SEO module 210. For example, the CMS editing module 418 on the SEO module 210 may be capable of editing an internal page of the CMS 220 and may push the edits to the internal page to the CMS 220 for publishing the edited internal page on a web site as a public page.

An SEO user may use the CMS editing module 418 to directly make actionable changes to an internal page of the CMS 220. For example, an SEO user may determine that a certain change to a web page may enhance web traffic and conversion events of the web page. The SEO user may identify the change to the web page based on recommendations provided by the recommendation module 114. The address translation module 420*a* may convert a public URL of the web page to a corresponding internal URL used in the CMS 220, and the CMS editing module 418 may enable the SEO user to initiate the change to the web page after the public URL is mapped to the internal URL. If the SEO module 210 and the CMS 220 are synchronized at the page level, the CMS editing module 418 may push the change made by the SEO user to the CMS 220 so that an internal page identified by the internal URL is modified on the CMS 220 accordingly. In a further example, referring to FIG. 2A, the SEO user may operate the computing device 211. The plugin module 214 of FIG. 2A may provide functionalities similar to those of the CMS editing module 418 so that the SEO user may push changes to web pages to the CMS 220 via the SEO module 210.

In these and other embodiments, the CMS editing module 418 may facilitate an SEO user to implement a change to a web page, where the web page is created and edited in an authoring environment. The edited page may be published as a live production web page accessible to end users on the network 102. To facilitate coordination between content teams on the CMS 220 and SEO teams on the SEO module 210, permission-based rules may be created to guide the editing of pages on the CMS editing module 418 and/or on the CMS 220. For example, pages with changes made by SEO users may be grouped for review and/or approval by the content teams before pushing the changes into a live production environment. Upon approval, the CMS editing module 418 may allow the SEO users to push certain changes into a production page. For example, an SEO user may add a keyword to a title, to move a keyword to a beginning of a body of text, and/or to make other changes with appropriate permissions on a production page.

The governance rule module 428 may be configured to implement governance rules for processing duplicate keyword-page pairings. A duplicate keyword-page pairing may indicate that a same keyword is paired with two or more pages, which may result in a potential pairing conflict in the pairings of the keyword and the two or more pages. For example, one or more authors or editors on the CMS 220 may try to associate or have already associated a same keyword with more than one page. The governance rule module 428 may apply one or more governance rules to solve the potential pairing conflict.

In some embodiments, a governance rule may describe that, if a user attempts to associate a keyword that has been paired with a first page with a second page, a potential pairing conflict may occur. The governance rule module 428 may alert the user or a system administrator of the potential pairing conflict. For example, the governance rule module 428 may flag the potential pairing conflict. However, if the user has permission to perform duplicate keyword-page pairings (e.g., the user being authorized to associate a same keyword with more than one page), the governance rule module 428 may allow the user to associate the keyword with the second page. As a result, both the first page and the second page may be paired with the same keyword. Additionally or alternatively, if the user has permission to perform duplicate keyword-page pairings, the governance rule module 428 may allow the user to override or reject the pairing between the keyword and the first page so that the potential pairing conflict may be resolved. For example, the user may remove the pairing between the keyword and the first page, associate a different keyword with the first page, and associate the keyword with the second page. Alternatively, the user may maintain the pairing between the keyword and the first page and may associate the second page with a different keyword.

However, if the user does not have permission to perform duplicate keyword-page pairings (e.g., the user is not authorized to associate a same keyword with more than one page), the governance rule module 428 may not allow the user to associate the keyword with the second page. The governance rule module 428 may present a warning message to the user indicating that the keyword is already paired with the first page and may not be paired with the second page. The user may associate the second page with a different keyword.

In some embodiments, the governance rule module 428 may provide instructions to the user describing how to resolve the pairing conflict. For example, the governance rule module 428 may instruct the user to contact an author of the first page who paired the keyword with the first page. Alternatively or additionally, the governance rule module 428 may instruct the user to create a ticket to flag the potential pairing conflict so that the potential pairing conflict may be resolved in a workflow tracking system. In some embodiments, a ticket or a report flagging the potential pairing conflict may be generated and delivered automatically to one or more related parties. The one or more related parties may include an author or editor of the first page who paired the keyword with the first page and/or a manager or coordinator who is responsible for solving the potential pairing conflict. Alternatively or additionally, the governance rule module 428 may trigger a chat exchange between the user and other related parties responsive to detecting the potential pairing conflict.

If the potential pairing conflict is resolved, a report describing the resolution of the potential pairing conflict may be generated. For example, the user may enter data describing the resolution of the potential pairing conflict. As another example, the governance rule module 428 may track a status of the potential pairing conflict and may generate the report in response to detecting the resolution of the potential pairing conflict. The governance rule module 428 may send the report to one or more related parties.

In some embodiments, the potential pairing conflict and/or the ticket created for the potential pairing conflict may be reported to external teams in other systems such as an SEO team on the SEO module 210. For example, the potential pairing conflict may be reported to an SEO team that monitors keyword-page pairings for a web site hosting the first page and/or the second page. Furthermore, such external teams may be authorized to resolve the potential pairing conflict. For example, the SEO team may determine that the keyword may be paired with the first page and may select another keyword to pair with the second page. The status of the potential pairing conflict and/or the status of the ticket may be synchronized across two or more different workflow systems, such as two or more separate workflow tracking systems used by two or more different teams. For example, there may be a first team working on content authoring and/or editing and a second team working on SEO optimization in the same enterprise. Alternatively, there may be one internal team working on content authoring and/or editing and one external team working on SEO performance, such as SEO staff managed by digital marketing agencies who are under contract with the enterprise to manage SEO on behalf of the enterprise. In these and other situations, the synchronization of the potential pairing conflict and/or the ticket between different teams may facilitate coordination between the different teams.

The governance rules and other conflict resolution mechanisms for detecting and resolving duplicate keyword-page pairings described herein may apply to pages that are live (publically available) on a production web site or pages in pre-production staging and testing modes. By mapping internal URLs in the CMS 220 to external public URLs for web pages that are accessible by end users on the web server 106, the governance rules and conflict resolution mechanisms described herein may also be applied to published web pages on the SEO module 210.

In some embodiments, the governance rule module 428 may apply a set of governance rules or a machine learning algorithm to detect duplicate keyword-page pairings and/or to recommend or enforce recommended or pre-selected keyword-page pairings automatically. Such governance rules and machine learning algorithms may result in changes in the keyword-page pairings over the life of pages, based on a wide variety of factors including, but not limited to, product release schedules, the type(s) of demographic information, historical patterns of behavior, or profiles of visitors to web sites, web site redesign, or re-build schedules, etc. The changes in the keyword-page pairings over the life of pages may include changing the keyword-page pairings at certain times under certain conditions and/or changing the keyword-page pairings dynamically over time in a programmed way.

An example use of governance rules may include determining and overriding keyword-page pairings for situations where more than one page may be paired with a keyword. For example, an enterprise such as an electronic company may operate in multiple countries and may market a cell phone under an identical name XYZ in different countries. The governance rule module 428 may pair pages for different countries with the same keyword such as the name XYZ for the cell phone. For example, both the US page for the cell phone and the France page for the cell phone may be paired with the phone name XYZ. When a visitor from a particular country searches for the cell phone XYZ using a search engine, the search engine may redirect the visitor to a page designated for the particular country based upon the particular country where the visitor is from.

Another example use of the governance rules may be involved with local search. For example, different local home pages for a Hotel ABC may be paired with the same keyword "Hotel ABC." If a visitor types "Hotel ABC" in a search engine, the visitor may be directed to a local home page of the Hotel ABC, depending on where the visitor is when performing the search.

In these and other example uses of the governance rules, the governance rules may allow two or more different pages to be associated with the same keyword. The governance rule module 428 may use the redirect logic of the web site to determine whether it is possible for the two or more pages to be paired with the same keyword. Alternatively, the governance rule module 428 may mirror how a search engine directs traffic rather than the web site logic. For example, a search engine may determine a location of a visitor to a web site and may redirect the visitor to a first web page of the web site rather than other web pages of the web site based on the visitor's location and corresponding search terms entered by the visitor. In this case, it's the search engine that reditects the visitor rather than the web site logic.

The different embodiments, examples, and/or implementations described above for processing duplicate keyword-page pairings are not intended to be exhaustive, and there may be numerous other possible embodiments, examples, and/or implementations. Furthermore, the embodiments, examples, and/or implementations may be applied in various combinations and may be customizable for different web sites. The rules and algorithms for those web sites may be incorporated into the logic of the governance rule module 428. In some embodiments, at least part of the functionality of the governance rule module 428 may be implemented regardless of whether there is a separate SEO system.

The duplicate detection module 441 may be configured to detect and address duplicate content on different pages. Although the duplicate detection module 441 is illustrated to reside on the CMS 220 for detecting duplicate content for pages being authored or edited inside the CMS 220, the duplicate detection module 441 may also reside on the SEO module 210 for detecting duplicate content for public-accessible pages. A duplicate keyword-page pairing may be an example of duplicate content on two or more pages. The above description for detecting and processing duplicate keyword-page pairings may also be applicable for detecting and processing duplicate content on two or more pages. For example, the duplicate detection module 441 may perform operations similar to those performed by the governance rule module 428 to detect and process duplicate content on two or more pages.

In some scenarios, a web site may have two or more pages including the same or similar content. The duplicate content on the two or more pages may negatively impact the search performance of the pages or even the entire web site. For example, commercial search engines may penalize a web site and its web pages in search results if the commercial search engines detect excessive amounts of duplicate content across multiple pages on the web site, or if web crawlers of the search engines detect that pages on the web site copy content from other web sites. Thus, the capability of detecting and processing duplicate content within a web site or across different web sites may be helpful to improve SEO performance of the web site.

In some embodiments, the duplicate detection module 441 may examine content on a page and may compare the content on the page to content on other pages. The comparison may be based on single words, phrases, combinations of phrases, sentences, paragraphs, a whole body of text, images, videos, audio clips, and another type of identifiable and distinguishable content that may appear on a web page. The pages to check for duplicate content may include pages in various stages inside the CMS 220, including pages being authored or edited; pages in production, test, and pre-production environments; and/or pages that are already live on the web site.

In some embodiments, the CMS 220 may be integrated with the SEO module 210 and/or other third party systems. The duplicate detection module 441 may incorporate information from crawls of public or other third party web sites conducted by the SEO module 210 and/or information from other third party systems. The duplicate detection module 441 may use the information to determine whether pages being authored or edited inside the CMS 220 have duplicate content with pages of other web sites.

In these and other embodiments, when duplicate content is detected between two or more pages, the duplicate detection module 441 may trigger actions to resolve conflicts associated with duplicate content. For example, the duplicate detection module 441 may create a ticket for the duplicate content or may flag the duplicate content. Similar to the processing of duplicate keyword-page pairings described above, the duplicate detection module 441 may apply governance rules and other conflict resolution mechanisms to resolve the conflicts caused by the duplicate content. The governance rules and conflict resolution mechanisms may include, but are not limited to: rule-driven decision trees; automatic detection, escalation and resolution mechanisms; triggering workflow inside a system; and mechanisms to integrate actions recommended or executed across more than one workflow system (e.g., the CMS 220 synchronizing information and data with the SEO module 210 for processing the duplicate content).

In some embodiments, web sites may be deliberately configured to include pages with duplicate content. For example, a page optimized for a tablet and a page optimized for a mobile device on the same web site might have identical or nearly identical content. A governance rule that is intended to prevent two pages from having duplicate content may be overridden. Alternatively or additionally, at least the incidence of duplicate content may be flagged for the user, and the user may be advised that there is deliberate duplicate content on the two pages. The duplicate detection module 441 may be configured to accommodate situations where different pages may have duplicate content.

In some embodiments, the duplicate detection module 441 (or an administrator of a web site) may share instructions, such as site map instructions, with search engines to help the search engines to figure out where to send visitors within the web site. The instructions may include information about pages with duplicate content. For example, it may be good to allow the duplicate detection module 441 to work on multiple pages in mass to perform this funcationality across the entire website.

The deep data module 442 may be configured to analyze and present competitive deep data received from the SEO module 210 on the CMS 220. In some embodiments, the SEO module 210 may aggregate competitive deep data about competitors' web sites and earned media performance and strategies. The competitive deep data may include a variety of information related to competitive pages. The competitive pages may compete with a web site for traffic associated with a keyword. It may be useful to include the competitive deep data in the CMS 220. For example, an author or editor of a given page in the CMS 220 may use the competitive deep data to determine one or more of: (1) competitive pages that may compete for organic search traffic with the given page; (2) SEO performance of web pages from predefined competitors and how the given page performs compared to the web pages from the predefined competitors; and (3) how to improve SEO performance of the given page based on competitive deep data related to the competitors.

The deep data module 442 may receive competitive deep data from the SEO module 210 and may use the competitive deep data to determine which pages are competitive pages for a page being authored by an author or being edited by an editor in the CMS 220. For example, for a given page paired with a particular keyword, the SEO module 210 may determine which pages may compete with the given page in the organic search channel for traffic when the given keyword is entered as a search term. If the SEO module 210 is integrated and synchronized with the CMS 220 at the page level, the SEO module 210 may send competitive deep data related to the competitive pages for the given keyword to the CMS 220. The deep data module 442 may present the competitive deep data to the author or editor using a user interface of the CMS 220.

The competitive deep data sent from the SEO module 210 to the CMS 220 may be structured, pre-filtered, and organized for simplified access, or may be configured based on design parameters to accommodate any specific implementation or custom needs of the CMS 220. In some embodiments, the competitive deep data may include information about some or all competitive pages determined by the SEO module 210 that may compete for organic search traffic on the same keyword paired with the given page, regardless of domains of the competitive pages. Alternatively or additionally, the competitive deep data may include information about an arbitrary number or a customizable number of competitive pages, such as information about the top ten competitive pages on the same keyword paired with the given page being authored or edited in the CMS 220. Alternatively or additionally, the competitive deep data may include information about competitive pages associated with a set of competitors. The set of competitors may be predefined or selected by users. Alternatively, the set of competitors may be determined by an algorithm or a machine learning module that estimates main competitors for one or more of an enterprise, a business unit of the enterprise, a group of pages, and a set of content on a given page or a group of pages.

In some embodiments, the deep data module 442 may instruct the CMS user interface module 446 to generate graphical data for providing a user interface that depicts the competitive deep data to a user (e.g., an author or editor) on the CMS 220. The competitive deep data displayed on the user interface may include a variety of information related to competitive pages. For example, competitive deep data related to a competitive page may include information about estimated search rank, estimated traffic to the competitive page, social signals about the competitive page (e.g., number of tweets, likes, shares, social mentions, sentiment analyses, etc.), backlinks to the competitive page, quality of backlinks to the competitive page, authors, and influencers associated with the competitive page or a portion of content on the competitive page, estimated pay-per-click (PPC) activities associated with the competitive page, estimated number of click-throughs for the competitive page, estimated cost of purchasing paid ads for one or more keywords associated with the competitive page, estimated conversion rates on the competitive page driven by various channels, actual text on the competitive page, data about non-text content on the competitive page that may provide information describing how competitors attract visitors to the competitive page (e.g., images, video, audio, download actions on the competitive page, forms that users may fill out on the competitive page, interactive elements or widgets on the competitive page, etc.), and some combination thereof.

In some embodiments, the SEO module 210 may include the deep index engine 108 to determine competitive deep data for a given page paired with a particular keyword and to send the competitive deep data to the deep data module 442. Alternatively or additionally, competitive pages determined by the SEO module 210 for a given page paired with a particular keyword may include pages from a result of applying a "Deep Index" of the web, as described in U.S. Pat. No. 8,190,594 entitled COLLECTING AND SCORING ONLINE REFERENCES.

Some embodiments of the system 400 described herein may include a client plugin or plugin module (collectively, plugin). The plugin may be a thin client plugin or a "thick" plugin, one that operates semi-independently of an external system, such as a third party system. The plugin may be embedded in or integrated with code of a third party system. The plugin may coordinate communication and pass data between a CMS system and an SEO system, commonly by utilizing application interfaces for each system. The plugin may thus enable analysis of digital content or any portion thereof through an action performed at the third party system during operation of the third party system. The plugin may further enable and facilitate communication between the third party system, the CMS 220, the SEO module 210, and/or a social network system. The communication enabled by the plugin may be such that data (e.g., recommendations, analysis results, etc.) communicated to one of the systems (e.g., the third party system or the SEO system) is displayed or otherwise accessible by one or more other systems. The display and accessibility of the data may allow an action to be taken in one of the systems and be consequently reflected in the other systems.

An example plugin may include the SEO plugin 444 configured to perform SEO edits (e.g., correcting SEO errors, making SEO optimizations, etc.) within the CMS 220. The SEO plugin 444 may be a thin-client plugin designed to manage communication and data transfer between the SEO module 210 and the CMS 220 rather than embedding a full-feature SEO system directly inside the CMS 220. A thin-client plugin may be more flexible than a thick-client solution. For example, a thin-client plugin may manage fewer functions internally and may allow related systems to operate more independently. A thin-client solution may make it more feasible, for example, to change SEO policies in the SEO module 210 rapidly and in a timely manner without requiring extensive changes to the codebase of the CMS 220 that manages digital content for a web site.

For example, an individual (e.g., an author, an editor) working on the CMS 220 may complete a version of a web page or group of web pages. Prior to publication, the individual may select to have the web page or group of pages analyzed by the SEO module 210. The individual may take an action such as selecting an icon or pushing a button in a user interface of the CMS 220, for instance, that indicates the individual wishes an analysis of the page or groups of pages to be conducted. Digital content and data about the web page or group of web pages may be forwarded from the CMS 220 to the SEO module 210 where an analysis of the digital content and data may be performed. In some embodiments, the SEO plugin 444 may include an encryption/decryption functionality to ensure the digital content is not compromised during the communication.

The analysis may then be performed based on an SEO policy set up by a party in control of the CMS 220 and/or the SEO module 210. In some implementations, the individual may select to analyze a portion of the web site and may select a second portion of the web site not to be analyzed or analyzed by a second set of filters in the SEO policy. The analysis may accordingly be performed on each of the web pages included in the web site or to each of the web pages selected by the individual to be analyzed.

The SEO policy may include one or more filters applied as criteria according to which the analysis is performed. The SEO module 210 may apply the SEO policy to determine with which of the filters the web site or portion thereof complies and with which of the filters the web site or portion thereof fails to comply. For instance, an SEO policy may include some number of specific filters. For illustrative purposes a particular implementation may include eleven filters. During the analysis it may be determined that the website or one or more specific web pages fail four of the eleven filters. The SEO module 210 then generates recommendations based on the failed filters. Like the analysis, the recommendations may be web page specific or web site specific. Thus, the recommendations may pertain only to a single web page that failed one or more of the filters or may generally apply to the entire web site.

The SEO module 210 may then communicate the results of the analysis (i.e., failure of four of the eleven filters), any analysis related thereto (e.g., an impact of a failure as high, medium, or low, etc.), and/or the recommendations to the CMS 220. In these and other embodiments, one or more of the results, the analysis related thereto, or the recommendations may be optionally viewed. For instance, the individual may have the option to select a "tell me more" icon or screen to receive one or more of information, explanation, or other data about the filter or the specific results, the analysis related thereto, or the recommendations. Additionally, the "tell me more" icon may include detailed explanations of the results, the analysis related thereto, or the recommendations and provide a link to a deep knowledge base about the filter, the recommendation, or the analysis applied by the SEO policy to the page or web site.

At the CMS 220, the individual may choose to view the filters for the web site or portion thereof fail to complied (referred to herein as the failed filters), analysis related thereto, and/or the recommendations. The failed filters, the analysis thereof, and/or the recommendations may be viewed in a drop-down menu in a user interface, for instance. Additionally or alternatively, the failed filters, the analysis thereof, and/or the recommendations may be communicated to a supervisory administrator. The administrator and/or the individual may enable the recommendations to enter into content group workflows, may select one or more of the recommendations as benchmarks prior to publication, may prioritize implementation of certain recommendations, and may generate reports based on the results or recommendations, which may be communicated through a third party and/or to the SEO module 210.

Execution of the recommendations may be automatically communicated to the SEO module 210 and/or throughout the party that controls the CMS 220. This tracking of execution of the recommendations may feed back into workflows, priorities lists, benchmark management, etc. to ensure the recommendations are executed as managed by the SEO module 210 in conjunction with the party.

Following execution of one or more of the recommendations, the SEO module 210 may track revenue or SEO results stemming from execution of the recommendations.

For example, inclusion of a particular keyword may be one of the recommendations. When executed, the keyword may be monitored for search results that lead users to the web page. The SEO results may be communicated to the party in control of the CMS 220, the CMS 220, or some other party, or may lead to additional recommendations, for instance.

The SEO plugin 444 for the CMS 220 may facilitate driving recommendations into digital content publishing earlier in authoring and editing processes, specifically prior to publishing on a production web site, rather than performing edits to digital content to improve SEO performance after the fact, i.e., downstream from the date the digital content is pushed into production on a web site. This enables commercial entities to initially and/or on an ongoing basis generate more effective and optimized digital content for their web sites much earlier in the content and publishing cycle and thus avoiding missing end-user conversion events and losing valuable online revenue.

In some embodiments, the SEO plug-in 444 may enable a user (e.g., an author or editor) to edit content within the plug-in itself. For example, the SEO plugin 444 may detect a problem describing that a title for a page does not include a keyword paired with the page. Before the page goes live, the keyword may be added to the title. When the problem is detected by the SEO plugin 444, the user may fix the problem directly within a user interface of the SEO plugin 444, rather than navigating to another user interface of the CMS 220 and fixing the problem in the other user interface. Fixing the problem directly within the SEO plugin 444 may be straightforward and may avoid confusion possibly caused by switching between different user interfaces of the CMS 220.

In some embodiments, the SEO plugin 444 may instruct the SEO module 210 to perform SEO analysis on content of a page and to determine changes to be made to the content of the page to improve search performance. For example, the SEO module 210 may detect two errors on the page, including that (1) a title of the page is one character longer than an optimum length of a title that is seen by a search engine and (2) no keyword is paired with the page. The lack of keyword-page pairing for the page may impact multiple content characteristics of the page, such as whether the keyword is in the page title or tags, or whether the text content on the page appears to use the selected keyword. The SEO module 210 may prioritize the detected errors and the SEO plug-in 444 may present the prioritized errors to the user in the CMS 220. The user may correct the errors within the plugin itself in an order from a most impactful error to a least impactful error. In some embodiments, the SEO module 210 may prioritize the detected errors based on user-controlled settings which are used by the user to configure importance of different types of SEO errors on a page.

The CMS user interface module 446 may be configured to generate graphical data for providing user interfaces on the CMS 220. For example, the CMS user interface module 446 may provide a user interface displaying errors detected by the SEO plugin 444. A user may correct the errors directly via the user interface. As another example, the CMS user interface module 446 may provide a user interface that allows a user to pair keywords with pages on the CMS 220. The user may enter keywords to pair with pages on a page-by-page basis. The pairing of keywords and pages in the user interface may automatically trigger the SEO module 210 to perform SEO analysis for the pages and to provide SEO recommendations to the user for improving SEO performance of the pages. As yet another example, the CMS user interface module 446 may provide a user interface for providing competitive deep data related to competitive pages to a user on the CMS 220. In some embodiments, the CMS user interface module 446 may provide functionalities similar to those provided by the user interface 116 of FIG. 1. The CMS user interface module 446 may generate graphical data for providing other user interfaces to users on the CMS 220.

In some embodiments, the system 400 may include a dialog feature enabling different teams in different systems to coordinate tasks. For example, the SEO module 210 may map a public address of a public page to an internal address of a corresponding internal page. The public page and the internal page may include the same or similar page content. The SEO module 210 may identify tasks associated with the page content and send the tasks to the CMS 220 so that CMS users in the CMS 220 may perform tasks using the corresponding internal address. For example, when an CMS user, such as an author or a creator, of the internal page in the CMS 220 opens the internal page, a dialog informing a task may be presented to the CMS user. The dialog may be initiated by an SEO user (e.g., an SEO manager) who has tagged the task to be performed in the CMS 220. The SEO user may provide additional instructions in his tag or alert notation to the author. For example, the dialog may display a message including a pending task identified by the SEO user and instructions for guiding the CMS user to perform the task. The dialog feature may help to close up the coordination gap between the SEO team on the SEO module 210 and the CMS user and/or other CMS users on the CMS 220 and may facilitate seamless communication between the SEO team and the CMS user and/or other CMS users.

When the CMS user views the dialog initiated from the SEO user, the author and the SEO user may continue to communicate via the dialog. Some or all of the dialog may be machine generated. For example, a notification of an issue that has been addressed may be generated automatically by the SEO module 210 or the CMS 220.

In the dialog, the SEO user may notify the CMS user or other CMS users of an issue associated with a page, ask the CMS user or other CMS user to review the issue, and/or instruct the CMS user or other CMS users to edit the page accordingly. In some embodiments, the SEO user may be able to directly change content of the page on the SEO module 210 if the SEO user has been authorized to do so. For example, if the SEO user has been permitted to access services provided by the CMS 220, the SEO user may push changes made to the page directly to the CMS 220 using the CMS editing module 418. In these and other examples, the SEO user, who has responsibility for optimizing content on the page for search engines, may identify and address tasks associated with optimization of the page, and may push changes to the page back to the CMS 220 where the page is created and prepared for publishing to a web site. Thus, SEO users with appropriate rights and permissions may use the CMS editing module 418 to edit page content and to publish the changes on corresponding pages on a production web site. Alternatively or additionally, other users may review the changes and may approve, reject, or modify the changes before the changes are applied to the pages and/or pushed to publish on the production web site.

Figure 5A:
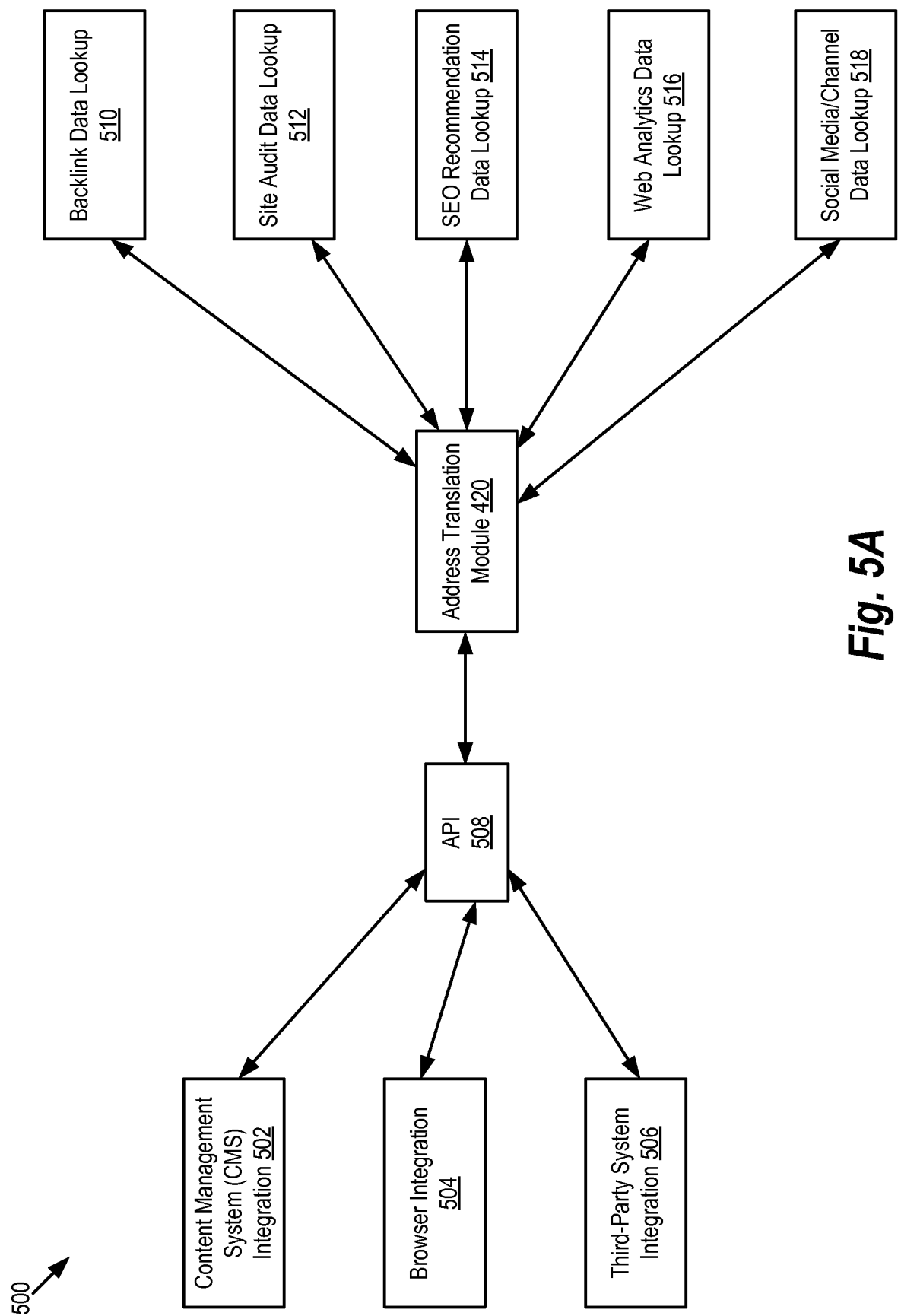
FIG. 5A illustrates an example embodiment of a comprehensive view of on-page metrics and recommendations.

FIG. 5A illustrates a comprehensive view 500 of on-page metrics and recommendations in accordance with some embodiments described herein. The comprehensive view 500 may allow a user to view information from a variety of related channels that are relevant for content performance. The related channels and signals provided by the systems may include, but are not limited to: SEO systems; web site crawlers that audit pages on a web site ("Site Auditors"); web analytics systems; social media; paid media; backlink data systems; e-commerce systems; and content delivery systems that may personalize content for the characteristics or demographics of the user. FIG. 5A illustrates a relationship of the address translation module 420 and various data lookups (e.g., a backlink data lookup 510, a site audit data lookup 512, an SEO recommendation data lookup 514, a web analytics data lookup 516, and a social media/channel data lookup 518).

The address translation module 420 may use an API 508 to enable integration with various third-party systems, including a CMS integration 502, a browser integration 504, and other third-party system integrations 506. In some embodiments, the various data lookups may be located in a SEO system, such as the SEO module 210 of FIGS. 2A and 4. In these and other embodiments, the address translation module 420 may also be part of the SEO system. Alternately or additionally, the address translation module 420 may be part of a different system that communicatively couples the SEO system and the various third party systems.

Figure 5B:
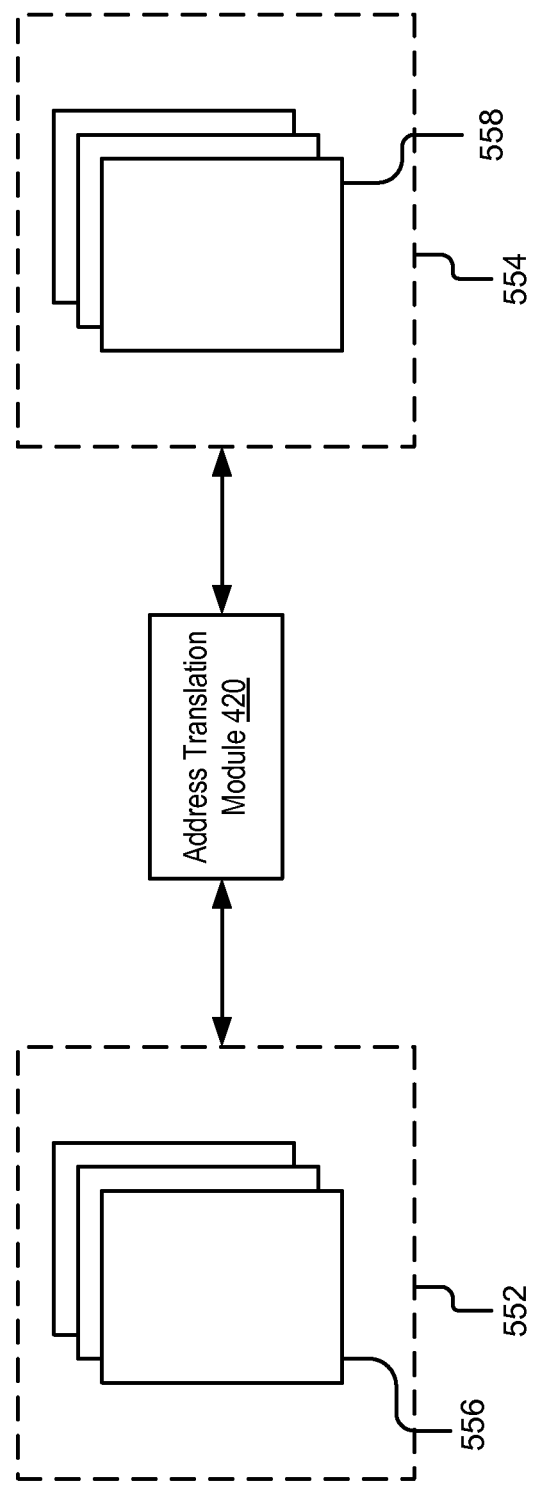
FIG. 5B illustrates an example embodiment of an address translation module.

FIG. 5B illustrates an example of the address translation module 420 in accordance with at least some embodiments described herein. FIG. 5B illustrates an example authoring environment 552 including one or more internal pages 556. A content authoring system may operate in the authoring environment 552. In some embodiments, the authoring environment 552 may also be a content management environment in which the CMS 220 may operate. The address translation module 420 may translate one or more internal addresses (e.g., one or more internal URLs) associated with the one or more internal pages 556 to one or more public addresses (e.g., one or more public URLs). The one or more internal pages 556 may be published as one or more public pages 558 at the one or more public addresses in a production environment 554 (or a publication environment). The one or more public pages 558 may be publicly accessible pages while the one or more internal pages 556 may be accessible in the authoring environment 552. Alternatively or additionally, the address translation module 420 may also translate the one or more public addresses associated with the one or more public pages 558 to the one or more internal addresses associated with the one or more internal pages 556.

Figure 6:
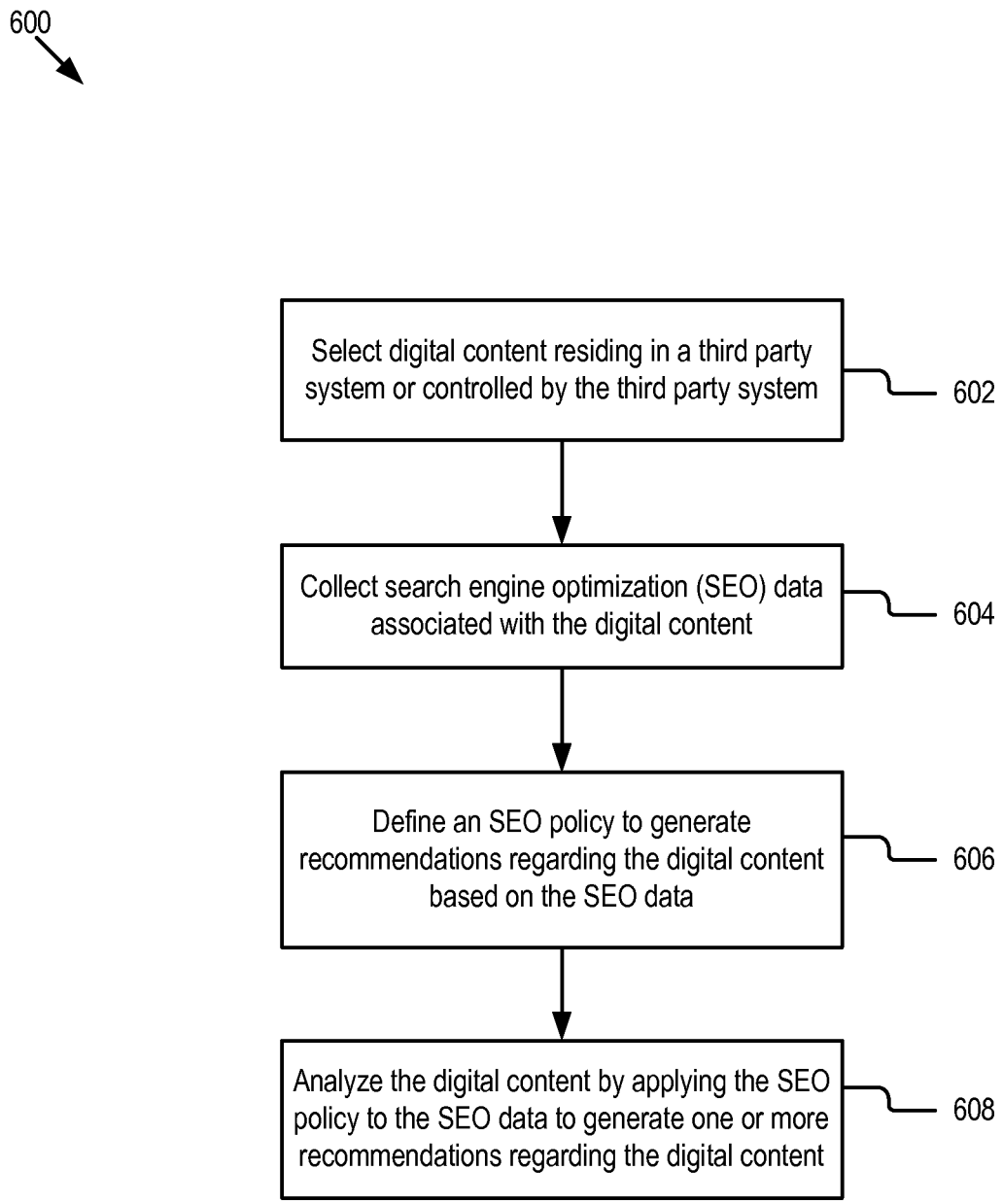
FIG. 6 illustrates an example method of managing digital content.

FIG. 6 is a flowchart of an example method 600 of managing digital content in accordance with at least some embodiments described herein. The method 600 may be implemented, in some embodiments, by an SEO system, such as the SEO system 100 of FIG. 1. For instance, the recommendation module 114 within the SEO system 100 of FIG. 1 may be configured to execute computer instructions to cause the SEO system 100 to perform operations for managing digital content as represented by one or more of blocks 602, 604, 606, and 608 of the method 600. Although illustrated as discrete blocks, various blocks may be divided into additional blocks, combined into fewer blocks, or eliminated, depending on the desired implementation.

The method 600 may begin at 602 by selecting digital content residing in a third party system or controlled by the third party system. In some embodiments, the third party system may include a CMS, a web analytics system, a social media network, a social media publishing system, a social media analytics and metrics system, or a paid media system. In some embodiments, the method 600 may alternatively include receiving or obtaining an identification of digital content, such as a web page that resides in, controlled by, or associated with the third party system.

At 604, the method 600 may include collecting SEO data associated with the digital content. In some embodiments, the collecting the SEO data associated with the digital content may include receiving or obtaining one or more keywords related to the digital content, such as a web page.

At 606, the method 600 may include defining an SEO policy to generate recommendations regarding the digital content based on the SEO data. In some embodiments, the SEO policy may be customized based on the type of digital content.

At 608, the method 600 may include analyzing the digital content by applying the SEO policy to the SEO data to generate one or more recommendations regarding the digital content. The recommendations may be generated in real-time or near real-time and/or may be generated at one or more times as the digital content is being developed. For example, the recommendations may be generated without direct user interaction once the digital content is published.

For example, the SEO policy may be defined to include a criterion that the digital content appears in the first twenty search results for a commercial search using a particular keyword. SEO data may be collected using a deep index engine regarding the particular keyword and search results using the particular keyword. If the digital content does not appear in the first twenty search results, then recommendations regarding the digital content may be generated to move the digital content into the first twenty results. As the digital content is modified or edited, the deep index engine may continue to collect SEO data regarding the search results using the particular keyword of the digital content. Additionally, a third party may re-define the criterion to ensure the digital content appears in the first ten search results. In response, recommendations may be generated to move the digital content into the first ten search results.

In some embodiments, the recommendations may be triggered automatically, through selection of an object shown on-screen in a drop-down menu, or through selection of an on-screen recommendation button being a selectable feature in the third party system. Additionally or alternatively, one or more of the recommendations may be generated according to a third party system template.

The method 600 may further include prioritizing the recommendations based on one or more parameters. The parameters may include, but are not limited to, a corporate policy, a best practice, an estimated search result, an actual search result, a social engagement metric, or a desired financial result.

In some embodiments, analyzing the digital content occurs in the third party system. Additionally or alternatively, analyzing the digital content may occur differently in different implementation environments. The different implementation environments may include a sandbox environment, a test environment, a development environment, a certification environment, a qualification environment, a pre-production environment, or a live production environment accessible to users.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, the method 600 may include estimating a financial or optimization result of the third party executing one or more of the recommendations.

Additionally or alternatively, the method 600 may include pushing the recommendations to the third party system, managing the recommendations to determine which of the recommendations to execute at the third party, and tracking financial or optimization results achieved by executing the recommendations. Additionally or alternatively, the method 600 may include consolidating multiple SEO policies such that the consolidated SEO policies constitute a centralized policy management solution.

In some embodiments, the method 600 may include receiving parameters associated with the digital content. In these and other embodiments, analyzing the digital content may include applying the SEO policy to the parameters.

In some embodiments, the method 600 may include executing the recommendations at an SEO system. When the recommendations are executed, the executed recommendations may be pushed to the third party system. In these and other embodiments, pushing the executed recommendations may be without any intervention by the third party system or users of the third party system.

Additionally or alternatively, the method 600 may include communicating the recommendations to the third party system. At the third party system, the recommendations may be proposed to the third party and executed subject to the approval or adjustment of the third party.

In some embodiments, the method 600 may include presenting an overlay on top of the digital content. The overlay may indicate problems of the digital content and recommendations regarding the digital content.

Additionally or alternatively, the method 600 may include analyzing multiple digital contents to detect duplicative items across different digital contents. When detected, the duplicative items may be highlighted and evaluated by the third party.

Additionally or alternatively, the method 600 may include analyzing the digital content to detect a pattern in two or more recommendations. The pattern may include an association between a specific digital content template or a type of digital content template, a whole section of web sites, a specific editorial team, a sub-domain, a type of tag, a title, or digital content with a specific problem.

Figure 7:
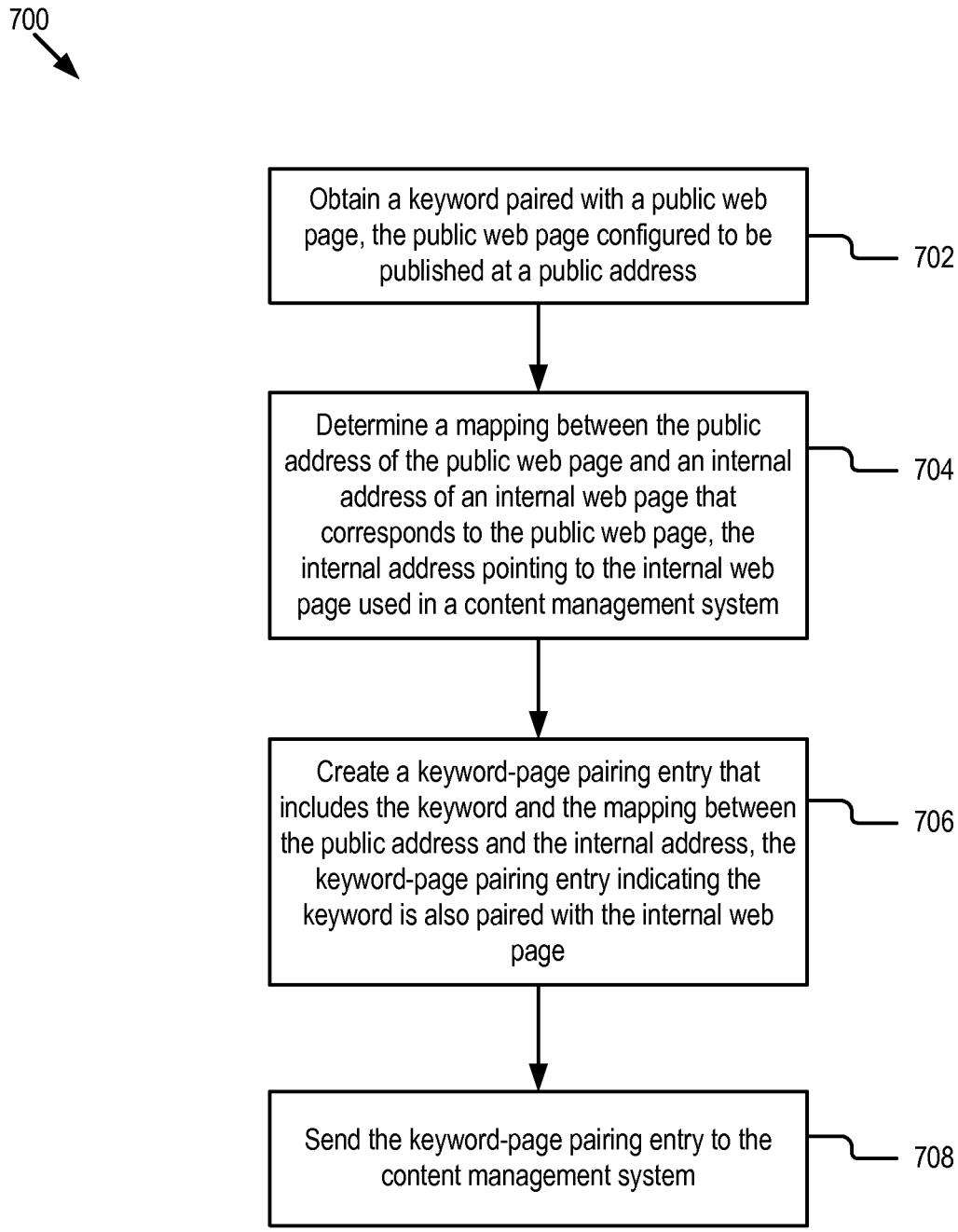
FIG. 7 illustrates an example method of pairing keywords with web pages performed by the SEO module of FIGS. 2A and 4.

FIG. 7 illustrates an example method 700 of pairing keywords with web pages, arranged in accordance with at least some embodiments described herein. The method 700 may be implemented, in some embodiments, by an SEO system, such as the SEO system 100 of FIG. 1 or the SEO module 210 of FIGS. 2A and 4. For instance, the SEO pairing module 412, the SEO sync module 414, and the address translation module 420a within the SEO module 210 of FIG. 4 may be configured to execute computer instructions to cause the SEO module 210 to perform operations for pairing keywords with web pages as represented by one or more of blocks 702, 704, 706, and 708 of the method 700. Although illustrated as discrete blocks, various blocks may be divided into additional blocks, combined into fewer blocks, or eliminated, depending on the desired implementation.

The method 700 may begin at block 702 by obtaining a keyword paired with a public web page. The public web page may be published at a public address. In some embodiments, the keyword paired with a public web page may be obtained by determining the paired keyword.

At 704, the method 700 may include determining a mapping between the public address of the public web page and an internal address of an internal web page that corresponds to the public web page. For example, the method 700 may include translating a public URL to a corresponding internal URL. The internal web page may be an internal version of the public web page used in the CMS 220. The internal address may point to the internal web page used in the CMS 220.

At 706, the method 700 may include creating a keyword-page pairing entry that includes the keyword and the mapping between the public address and the internal address. The keyword-page pairing entry may indicate that the keyword is also paired with the internal web page. At 708, the method 700 may include sending the keyword-page pairing entry to the CMS 220.

Figure 8:
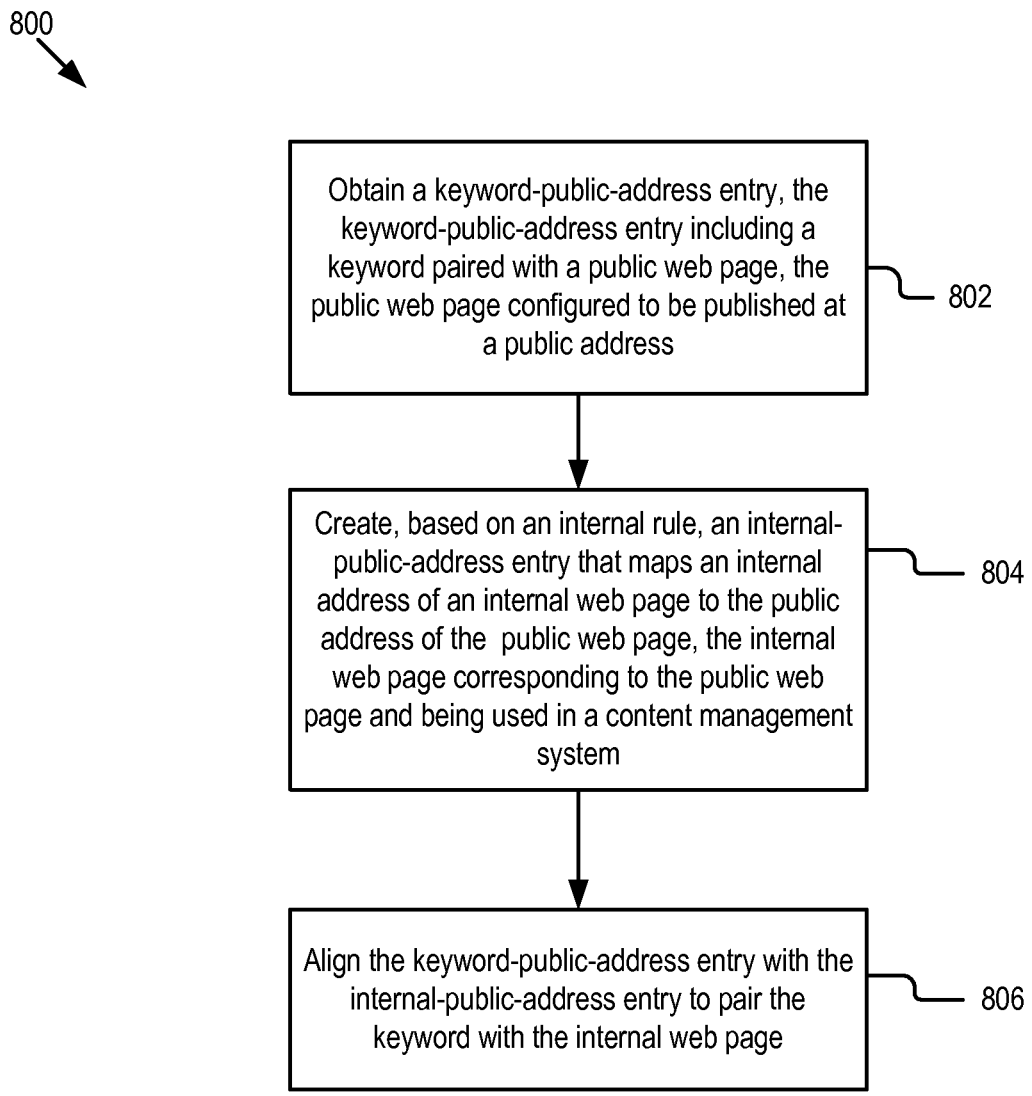
FIG. 8 illustrates an example method of pairing keywords with web pages performed by the CMS of FIGS. 2A and 4.

FIG. 8 illustrates an example method 800 of pairing keywords with web pages, arranged in accordance with at least some embodiments described herein. The method 800 may be implemented, in some embodiments, by a CMS, such as the CMS 220 of FIGS. 2A and 4. For instance, the CMS pairing module 424, the CMS sync module 426, and the address translation module 420b within the CMS 220 of FIG. 4 may be configured to execute computer instructions to cause the CMS 220 to perform operations for pairing keywords with web pages as represented by one or more of blocks 802, 804, and 806 of the method 800. Although illustrated as discrete blocks, various blocks may be divided into additional blocks, combined into fewer blocks, or eliminated, depending on the desired implementation.

The method 800 may begin at block 802 by obtaining a keyword-public-address entry, such as the SEO system 100 of FIG. 1 or the SEO module 210 of FIGS. 2A and 4. The keyword-public-address entry may include a keyword paired with a public web page. The public web page may be published at a public address. In some embodiments, the keyword-public-address entry may be obtained from an SEO system. Alternately or additionally, the keyword-public-address entry may be determined by the CMS system 220.

At 804, the method 800 may include creating, based on an internal rule, an internal-public-address entry that maps an internal address of an internal web page to the public address of the public web page. The internal web page may correspond to the public web page and may be used in the CMS 220.

At 806, the method 800 may include aligning the keyword-public-address entry with the internal-public-address entry to pair the keyword with the internal web page. For example, the keyword-public-address entry may be stored in a keyword-public-address mapping table. The internal-public-address entry may be stored in an internal-public-address mapping table. The method 800 may align the keyword-public-address mapping table with the internal-public-address mapping table to pair keywords with corresponding internal web pages.

In some embodiments, the method 800 may include determining an edit applied to the keyword on the CMS 220 and synchronizing the edit applied to the keyword between the CMS 220 and the SEO system on a page level based on a mapping between the internal address of the internal web page and the public address of the public web page.

Alternatively or additionally, the method 800 may include detecting a duplicate keyword-page pairing on the CMS 220. The duplicate keyword-page pairing may indicate presence of a potential pairing conflict. The potential pairing conflict may indicate the keyword is paired with more than one web page. The method 800 may include applying one or more governance rules to resolve the potential pairing conflict. For example, the method 800 may create a ticket describing the potential pairing conflict, flag the potential pairing conflict on the CMS, and track a status of the potential pairing conflict. Alternatively or additionally, the method 800 may include detecting that the potential pairing conflict is resolved and generating a report responsive to detecting that the potential pairing conflict is resolved.

Alternatively or additionally, the method 800 may include detecting duplicate content present on the internal web page and a third web page. The method 800 may include applying one or more governance rules to manage the duplicate content. Alternatively or additionally, the method 800 may include receiving competitive deep data related to competitive pages of the internal web page and presenting the competitive deep data on the CMS 220.

Some embodiments described herein include a computer program product having computer-executable instructions for causing a computing system having the computer program product to perform a computing method of the computer-executable instructions for managing digital content and/or pairing keywords with pages. The computing method may be any method described herein as performed by a computing system. The computer program product may be located on a computer memory device, which may be removable or integrated with the computing system.

Some embodiments described herein include a computing system capable of performing the methods described herein. As such, the computing system may include a memory device that has the computer-executable instructions for performing the method. In some embodiments, a computing device, such as a computer or memory device of a computer, may include one or more modules or systems discussed with reference to FIGS. 1, 2, and 4. These modules may be configured to perform any of the methods described herein. In addition, these modules may be combined into a single module or on a single platform. In some embodiments, a computer program product may include one or more algorithms for performing any of the methods of any of the claims.

FIG. 9 illustrates an example keyword-page pairing table 902, arranged in accordance with at least some embodiments described herein. The keyword-page pairing table 902 may include keyword-page pairing entries, such as a keyword-page pairing entry 910. The keyword-page pairing table 902 may map a public page URLs 906 to an internal CMS page URLs 904 and may establish pairing relationships between the internal CMS page URLs 904 and corresponding keywords 908. The keyword-page pairing table 902 may also establish pairing relationships between the public page URLs 906 and the corresponding keywords 908.

FIG. 10A illustrates an example internal-public-address mapping table 1002 and an example keyword-public-address mapping table 1004, arranged in accordance with at least some embodiments described herein. The internal-public-address mapping table 1002 may include multiple rows with each row representing a corresponding internal-public-address entry. Each internal-public-address entry may map a corresponding internal CMS page URL 1008 to a corresponding public page URL 1010 derived from the internal CMS page URL 1008 based on a CMS internal rule. The keyword-public-address mapping table 1004 may include multiple rows with each row representing a corresponding keyword-public-address entry. Each keyword-public-address entry may include a corresponding public page URL 1012 used in an SEO system and one or more keywords 1014 paired with the corresponding public page URL 1012. In FIG. 10A, the keyword-public-address mapping table 1004 is not aligned with the internal-public-address mapping table 1002.

FIG. 10B illustrates an example alignment of the keyword-public-address mapping table 1004 and the internal-public-address mapping table 1002 of FIG. 10A, arranged in accordance with at least some embodiments described herein. Rows in the internal-public-address mapping table 1002 of FIG. 10A may be adjusted to generate an aligned keyword-public-address mapping table 1006. Rows in the aligned keyword-public-address mapping table 1006 are aligned with corresponding rows in the internal-public-address mapping table 1002. For example, a row 1020 in the internal-public-address mapping table 1002 is aligned with a row 1022 in the aligned keyword-public-address mapping table 1006, and both rows 1020 and 1022 have a public page URL "www.store.com/saleshoes" in common. Thus, a keyword "red shoes" paired with the public page URL "www.store.com/saleshoes" is also paired with the corresponding internal CMS page URL "staging.store.com/cf#/saleshoes."

Figure 11:
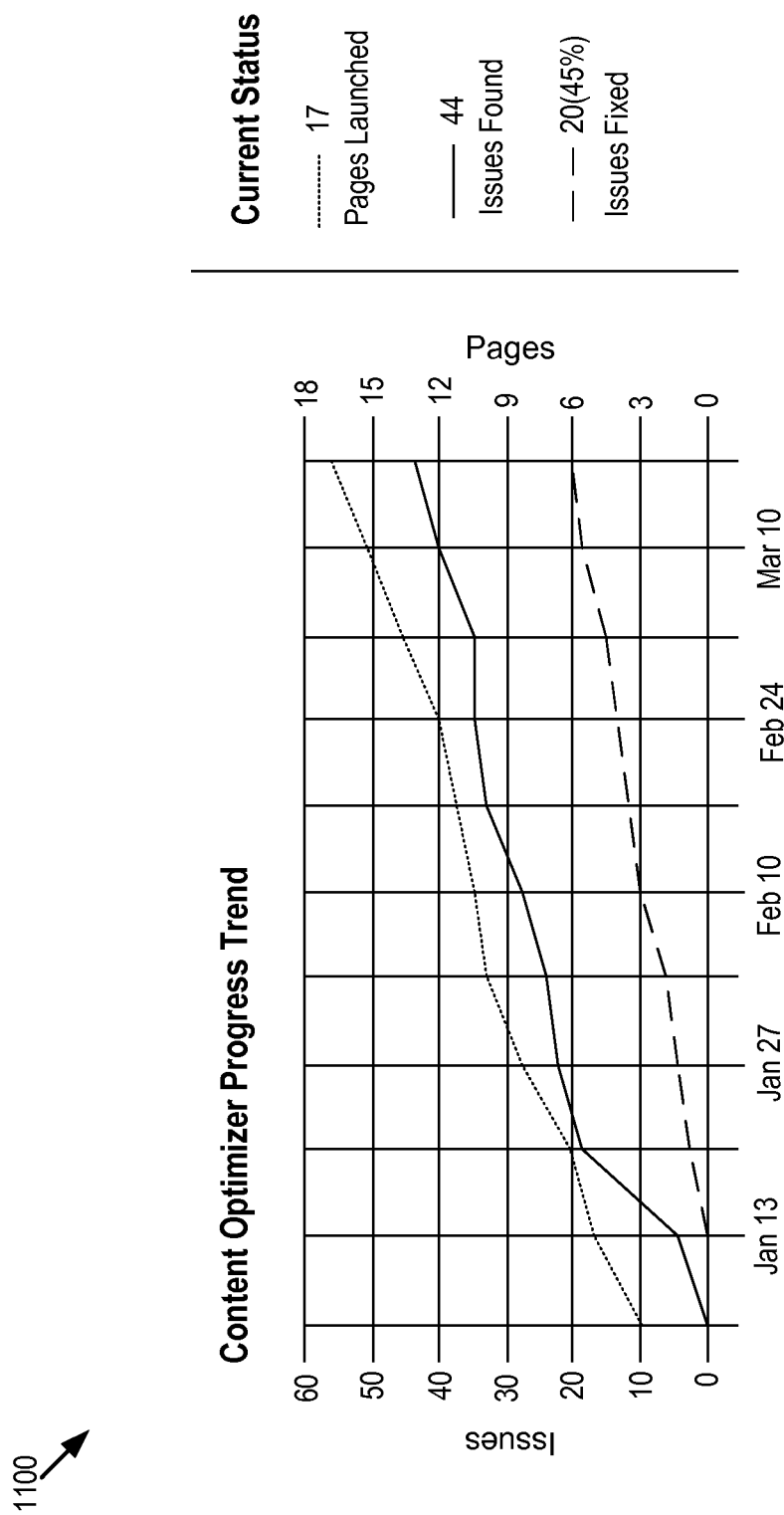
FIG. 11 illustrates an example embodiment of a report that tracks usage and impact of an SEO system integrated with a CMS.

FIG. 11 illustrates an example report 1100 that may track usage and impact of an SEO system integrated with a CMS in accordance with at least some embodiments described herein. The report 1100 may help managers and end users to track usage, technical, and business impact showing checks, filters, recommendations, and possible fixes that may have been applied.

Figure 12:
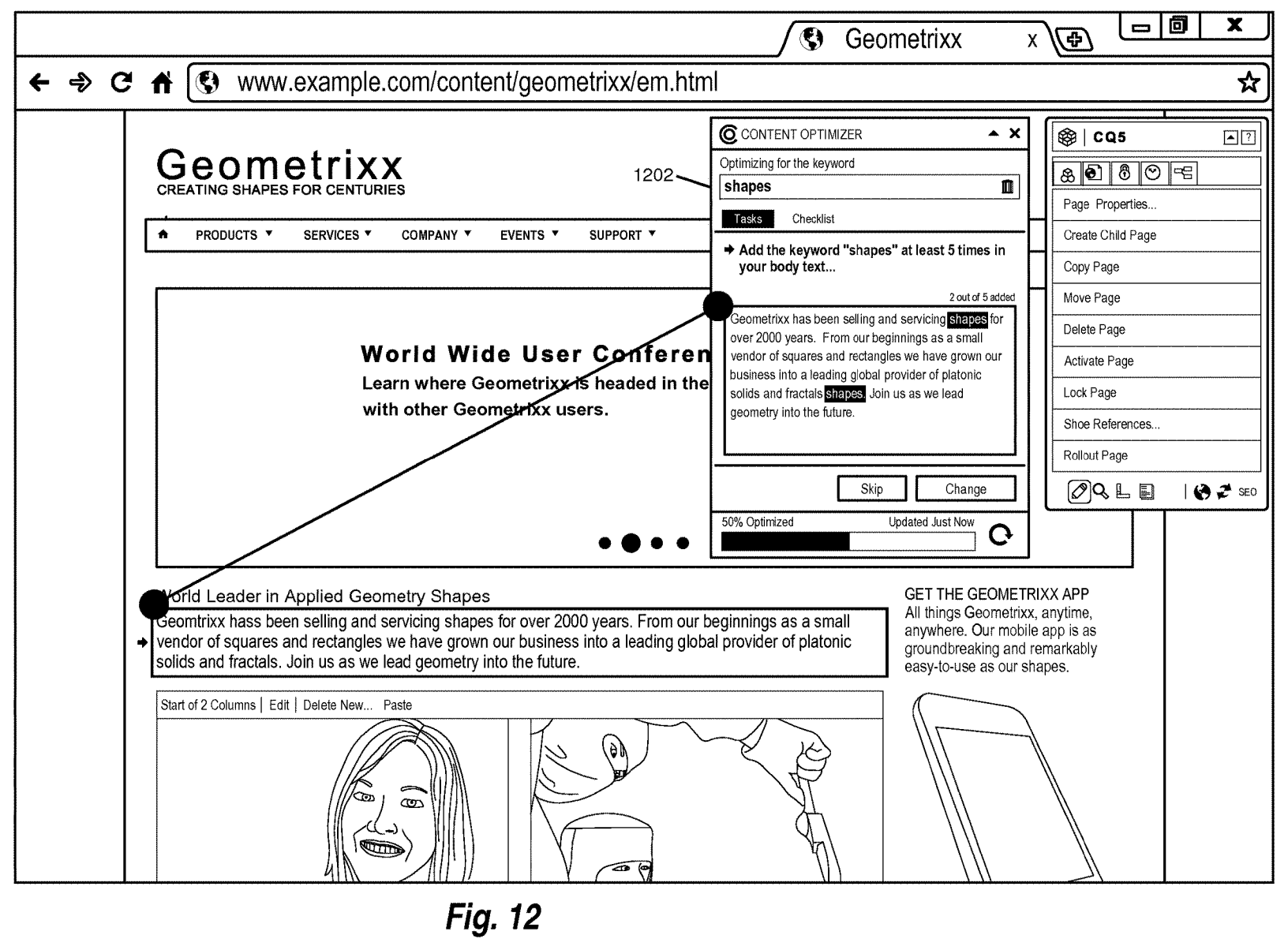

FIG. 12 illustrates an example recommendation 1202 highlighted on a page, arranged in accordance with at least some embodiments described herein. The recommendation 1202 may be highlighted on on-screen page sections integrated inside a CMS for providing guidance on recommendations and suggestions to optimize pages for search engines and/or to improve content performance.

Figure 13:
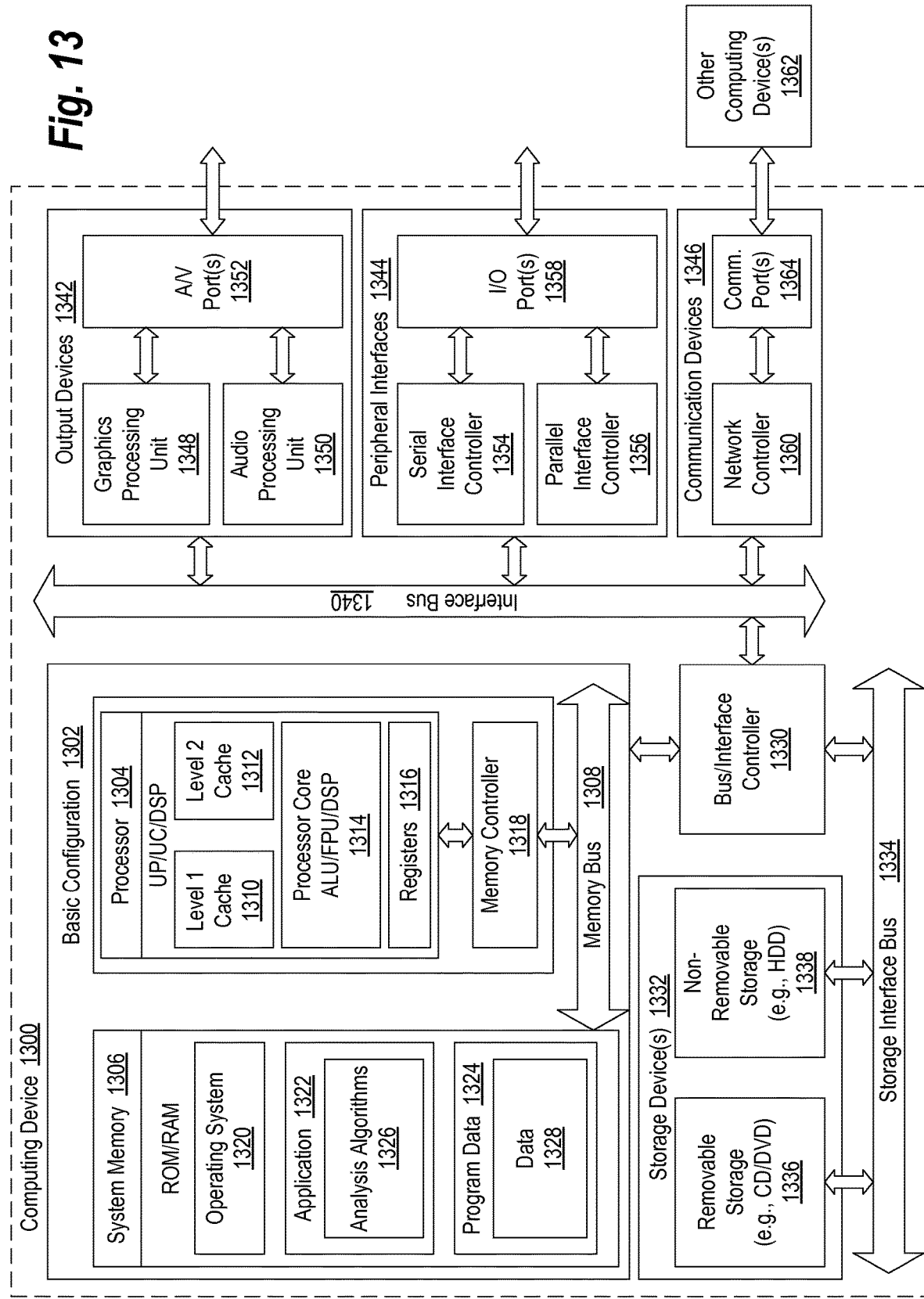
FIG. 13 illustrates an example embodiment of a computing device.

FIG. 13 illustrates an example computing device 1300 that is arranged to perform any of the computing methods described herein. In a very basic configuration 1302, the computing device 1300 generally includes one or more processors 1304 and a system memory 1306. A memory bus 1308 may be used for communicating between the processor 1304 and the system memory 1306.

Depending on the desired configuration, the processor 1304 may be of any type including, but not limited to, a microprocessor (LIP), a microcontroller (gC), a digital signal processor (DSP), or any combination thereof. The processor 1304 may include one more levels of caching, such as a level one cache 1310 and a level two cache 1312, a processor core 1314, and registers 1316. The processor core 1314 may include an arithmetic logic unit (ALU), a floating-point unit (FPU), a digital signal-processing core (DSP core), or any combination thereof. An example memory controller 1318 may also be used with the processor 1304, or in some implementations, the memory controller 1318 may be an internal part of the processor 1304.

Depending on the desired configuration, the system memory 1306 may be of any type including, but not limited to, volatile memory (such as RAM), non-volatile memory (such as ROM, flash memory, etc.) or any combination thereof. The system memory 1306 may include an operating system 1320, one or more applications 1322, and program data 1324. The application 1322 may include an analysis algorithm 1326 that is arranged to perform the functions as described herein including those described with respect to methods described herein. The analysis algorithm 1326 may correspond to the recommendation module 114 of FIG. 1, for example. The program data 1324 may include data 1328, such as SEO data, parameters, SEO results, etc. that may be useful for generating recommendations for digital content.

In some embodiments, the application 1322 may be arranged to operate with the program data 1324 on the operating system 1320.

The computing device 1300 may have additional features or functionality, and additional interfaces to facilitate communications between the basic configuration 1302 and any required devices and interfaces. For example, a bus/interface controller 1330 may be used to facilitate communications between the basic configuration 1302 and one or more data storage devices 1332 via a storage interface bus 1334. The data storage devices 1332 may be removable storage devices 1336, non-removable storage devices 1338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 1306, the removable storage devices 1336, and the non-removable storage devices 1338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 1300. Any such computer storage media may be part of the computing device 1300.

The computing device 1300 may also include an interface bus 1340 for facilitating communication from various interface devices (e.g., output devices 1342, peripheral interfaces 1344, and communication devices 1346) to the basic configuration 1302 via the bus/interface controller 1330. The output devices 1342 include a graphics processing unit 1348 and an audio processing unit 1350, which may be configured to communicate to various external devices such as a display or speakers via one or more A/V ports 1352. The peripheral interfaces 1344 include a serial interface controller 1354 or a parallel interface controller 1356, which may be configured to communicate with external devices such as input devices (e.g., keyboard, mouse, pen, voice input device, touch input device, etc.) or other peripheral devices (e.g., printer, etc.) via one or more I/O ports 1358. The communication device 1346 includes a network controller 1360, which may be arranged to facilitate communications with one or more other computing devices 1362 over a network communication link via one or more communication ports 1364.

The network communication link may be one example of a communication media. Communication media may generally be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 1300 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device 1300 may also be implemented as a personal computer including both laptop computer and non-laptop computer configurations. The computing device 1300 may also be any type of network computing device. The computing device 1300 may also be an automated system as described herein.

The present disclosure is not to be limited in terms of the particular embodiments described in this application, which are intended as illustrations of various aspects. The various embodiments described herein include multiple different configurations of systems, modules, components, etc. Some embodiments may include more of the described configurations than others. It should be understood that no embodiment is required to include all the configurations or some combination of all the configurations described herein. Rather many modifications and variations may be made without departing from its spirit and scope, as will be apparent to those skilled in the art.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application-Specific Integrated Circuits (ASICs), Field-Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to carry out the distribution. Examples of a signal-bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber-optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that, in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

The embodiments described herein may include the use of a special-purpose or general-purpose computer including various computer hardware or software modules. Embodiments within the scope of the present invention also include computer-readable media for carrying or having computer-executable instructions or data structures stored thereon. Such computer-readable media may be any available media that may be accessed by a general-purpose or special-purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general-purpose or special-purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data that cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method comprising:
    obtaining a keyword paired with a public web page, the public web page configured to be published at a public address;
    determining a mapping between the public address of the public web page and an internal address of an internal web page that corresponds to the public web page, the internal address pointing to the internal web page used in a content management system configured to generate the internal web page and the public web page;
    creating a keyword page pairing entry that includes the keyword and the mapping between the public address and the internal address, the keyword page pairing entry indicating the keyword is paired with the internal web page;
    sending the keyword page pairing entry to the content management system;
    in response to creating the keyword page pairing entry, automatically triggering a search engine optimization (SEO) system to perform an analysis of SEO data of one or both of the internal web page and the public web page in the content management system, wherein the analysis includes determining whether the SEO data complies with SEO rules or SEO policies;
    based on the analysis, generating one or more first recommendations to turn non-compliant SEO data of the SEO data into compliant SEO data, the compliance with respect to one or both of the SEO rues and the SEO policies;
    obtaining one or more second recommendations related to a second web page, the second web page being related to the public web page;
    comparing the one or more first recommendations with the one or more second recommendations;
    based on the comparison between the one or more first recommendations and the one or more second recommendations, identifying a pattern in the one or more first recommendations and the one or more second recommendations;
    generating one or more third recommendations based on the pattern; and
    pushing the one or more third recommendations from the SEO system to the content management system.

2. The method of claim 1, wherein the public address includes a public uniform resource locator (URL) associated with the public web page and the internal address includes an internal URL associated with the internal web page.

3. The method of claim 1, further comprising creating an address mapping file that maps public addresses of public web pages to internal addresses of internal web pages that correspond to the public web pages, wherein the mapping between the public address of the public web page and the internal address of the internal web page is determined based on the address mapping file.

4. The method of claim 1, further comprising:
determining, at the SEO system, an edit to the internal web page; and
bidirectionally synchronizing the edit between the SEO system and the content management system on a page level based on the mapping between the public address and the internal address, the bidirectional synchronization achieved using one or more of: an application program interface (API), a plug-in, and a file transfer protocol (FTP) process.

5. The method of claim 4, wherein the edit to the internal web page includes adding the keyword to one of a page title, a tag, and a body of text in the internal web page.

6. The method of claim 1, further comprising synchronizing one or more SEO objects associated with the public web page with the content management system on a page level based on the mapping between the public address and the internal address.

7. The method of claim 1, wherein determining the mapping between the public address of the public web page and the internal address of the internal web page comprises translating the public address of the public web page to the internal address of the internal web page.

8. The method of claim 1, further comprising creating a keyword-page pairing entry that includes the keyword and the mapping between the public address and the internal address, the keyword-page pairing entry indicating the keyword is paired with the internal web page.

9. The method of claim 8, further comprising:
creating, at the SEO system, a keyword-page pairing table that includes the keyword-page pairing entry; and
bidirectionally synchronizing the keyword-page pairing table between the SEO system and the content management system, the bidirectional synchronization achieved using one or more of: an application program interface (API), a plug-in, and a file transfer protocol (FTP) process.

10. A method comprising:
obtaining a keyword-public-address entry, the keyword-public-address entry including a keyword paired with a public web page, the public web page configured to be published at a public address;
creating an internal-public-address entry that maps an internal address of an internal web page to the public address of the public web page, the internal web page corresponding to the public web page and being used in a content management system; and
aligning the keyword public address entry with the internal public address entry to pair the keyword with the internal web page;
pairing the keyword public address entry with the internal public address entry;
in response to the creating; automatically triggering a search engine optimization (SEO) system to perform an analysis of SEO data of one or both of the internal web page and the public web page in the content management system, wherein the analysis includes determining whether the SEO data complies with SEO rules or SEO policies;
based on the analysis, generating on or more first recommendations to turn non-compliant SEO data of the SEO data into compliant SEO data, the compliance with respect to one or both of the SEO rules and the SEO policies;
obtaining one or more second recommendations related to a second web page, the second web page being related to the public web page;
comparing the first recommendations with the second recommendations; based on the comparison between the first recommendations and the second recommendations, identifying a pattern in the first recommendations and the second recommendations;
generating one or more third recommendations based on the pattern; and
pushing the one or more third recommendations from the SEO system to the content management system.

11. The method of claim 10, wherein the public address includes a public uniform resource locator (URL) associated with the public web page and the internal address includes an internal URL associated with the internal web page.

12. The method of claim 10, further comprising:
determining, at the content management system, an edit applied to the keyword; and
bidirectionally synchronizing the edit applied to the keyword between the content management system and the SEO system on a page level using the internal-public-address entry, the bidirectional synchronization achieved using one or more of: an application program interface (API), a plug-in, and a file transfer protocol (FTP) process.

13. The method of claim 10, further comprising:
detecting a duplicate keyword-page pairing on the content management system, the duplicate keyword-page pairing indicating presence of a potential pairing conflict; and
applying one or more governance rules to resolve the potential pairing conflict.

14. The method of claim 13, wherein the potential pairing conflict indicates the keyword is paired with more than one internal web page.

15. The method of claim 13, wherein applying one or more governance rules to resolve the potential pairing conflict comprises:
creating a ticket describing the potential pairing conflict;
flagging the potential pairing conflict on the content management system; and
tracking a status of the potential pairing conflict.

16. The method of claim 15, further comprising:
detecting that the potential pairing conflict is resolved; and
generating a report responsive to detecting that the potential pairing conflict is resolved.

17. The method of claim 10, further comprising:
detecting duplicate content present on the internal web page and a third web page; and
applying one or more governance rules to manage the duplicate content.

18. The method of claim 10, further comprising:
receiving competitive deep data related to competitive pages of the internal web page; and
presenting the competitive deep data on the content management system.

19. The method of claim 10, further comprising: the keyword-public-address entry is stored in a keyword-public-address mapping table; the internal-public-address entry is stored in an internal-public-address mapping table; and aligning the keyword-public-address entry with the internal public-address entry comprises aligning the keyword-public-address mapping table with the internal-public-address mapping table.

20. A computer-readable storage medium including instructions that cause a system to perform operations, the operations comprising:
- obtaining a keyword paired with a public web page, the public web page configured to be published at a public address;
- determining a mapping between the public address of the public web page and an internal address of an internal web page that corresponds to the public web page, the internal address pointing to the internal web page used in a content management system configured to generate the internal web page and the public web page;
- creating a keyword-page pairing entry that includes the keyword and the mapping between the public address and the internal address, the keyword-page pairing entry indicating the keyword is paired with the internal web page;
- sending the keyword-page pairing entry to the content management system;
- in response to creating the keyword-page pairing entry, automatically triggering a search engine optimization (SEO) system to perform an analysis of SEO data of one or both of the internal web page and the public web page in the content management system, wherein the analysis includes determining whether the SEO data complies with SEO rules or SEO policies;
- based on the analysis, generating one or more first recommendations to turn non-compliant SEO data into compliant SEO data, the compliance with respect to one or both of the SEO rules and the SEO policies;
- obtaining one or more second recommendations related to a second web page, the second web page being related to the public web page;
- comparing the one or more first recommendations with the one or more second recommendations;
- based on the comparison between the one or more first recommendations and the one or more second recommendations, identifying a pattern in the one or more first recommendations and the one or more second recommendations;
- generating one or more third recommendations based on the pattern; and
- pushing the third recommendations from the SEO system to the content management system.

* * * * *